United States Patent [19]

Woodrum

[11] 3,916,387

[45] Oct. 28, 1975

[54] DIRECTORY SEARCHING METHOD AND MEANS

[75] Inventor: Luther J. Woodrum, Poughkeepsie, N.Y.

[73] Assignee: International Business Machines Corporation, Armonk, N.Y.

[22] Filed: Nov. 12, 1973

[21] Appl. No.: 415,026

Related U.S. Application Data

[63] Continuation of Ser. No. 136,686, April 23, 1971, abandoned.

[52] U.S. Cl. ............................................ 340/172.5

[51] Int. Cl.² ............................................ G06F 7/22

[58] Field of Search ........................ 340/172.5; 444/1

[56] References Cited

UNITED STATES PATENTS

| | | | |
|---|---|---|---|
| 3,273,126 | 9/1966 | Owen et al. | 340/172.5 |
| 3,325,785 | 6/1967 | Stevens | 340/172.5 |
| 3,388,381 | 6/1968 | Prynes et al. | 340/172.5 |
| 3,391,394 | 7/1968 | Ottawax et al. | 340/172.5 |
| 3,546,677 | 12/1970 | Barton et al. | 340/172.5 |
| 3,568,156 | 3/1971 | Thompson | 340/172.5 |
| 3,579,194 | 5/1971 | Weinblatt | 340/172.5 |
| 3,614,745 | 10/1971 | Podvin et al. | 340/172.5 |
| 3,614,746 | 10/1971 | Klinkhamer | 340/172.5 |
| 3,643,226 | 2/1972 | Loizides et al. | 340/172.5 |
| 3,651,483 | 3/1972 | Clark et al. | 340/172.5 |

*Primary Examiner*—Leo H. Boudreau
*Attorney, Agent, or Firm*—Bernard M. Goldman

[57] ABSTRACT

An electrical method, and machine apparatus using that method, to efficiently locate objects through an electrical directory entity contained in the machine. An electrical identifier signal for an object is applied to the machine to cause it to automatically follow a connected path in the directory entity from its source location to an object address in the directory entity. To follow the path, a part of the identifier signal is selected by the electrical state of an index part of each current inner vertex in the path to locate the next vertex in the connected path, and so on in a repetitive manner until a sink vertex containing the object address is found at the end of the connected path.

17 Claims, 19 Drawing Figures

INVENTOR
LUTHER J. WOODRUM

BY Bernard M. Goldman

ATTORNEY

DIRECTORY SEARCHING METHOD AND MEANS

This is a continuation of application Ser. No. 136, 686 filed Apr. 23, 1971, now abandoned.

TABLE OF CONTENTS

Abstract
Table of Contents
Introduction
Prior Art
Utility and Objects
Drawing Description
Definition Table
Directory Generation
General Binary Tree Mapping
General Description of Directory
Hardware Configuration for General Computer
Matrix Form and Terminology
Edge Representations
General Flow Diagram of Directory Construction with Absolute Edge
TABLE A
Search Argument
Trace Vectors and Path Vectors
Path Vector Relationship to Search Argument
Edge and Flag Field Control During Searching
Content of a Sink Row
Searching a Directory with Offset Edges — SRCH1
Searching a Directory with Invertible Edges—SRCH2
Searching a Directory with Absolute Edges —SRCH3
Hardware Mode
TABLE B
Claims This invention relates generally to an efficient computer method and means for searching a special kind of unique directory which is generated with the use of the related inventions in patent applications Ser. Nos. 136,902 and 136,951, abandoned. filed by the same inventor on the same day as this application.

INTRODUCTION

The subject invention controls stored bits and machine states. In regard to the subject disclosure, it is important to understand that information can never be stored in a machine, only representations of information can be stored. The representation eventually must be interpreted by someone to have meaning as information. The thing that electronic/mechanical computers do that is useful is to change the way information is represented; all uses of digital computers are dependent on this fact.

The embodiments of this invention include unique methods and means for precisely controlling a computing machine, and they provide:

a. The machine-representation of information in forms amenable to computer storage and interrogation for controlling machine execution, and
b. The steps on the machine-representation of information in sufficient detail that a person skilled in the art can make and use them in hardware, microprogram, or program, which is executable by a special or general-purpose computer system.

PRIOR ART

The prior art includes the subject matter in such works as "Fundamental Algorithms, the Art of Computer Programming" by D. E. Knuth published in 1968 by Addison-Wesley Publishing Company, "Automatic Data Processing" by F. P. Brooks and K. E. Iverson, published by Wiley, and "A Programming Language" by K. E. Iverson published by Wiley, all of which are widely being taught in many universities to students working toward B.S. degrees in Computing Science; therefore they must be considered current average skill-in-the-art tools in the digital computer arts.

The terminology used in this specification is similar to the terminology used in these works and in the journal of the ACM.

The art also includes the following prior U.S. patents and application: Pat. No. 3,593,309 "Method and Means for Generating Compressed Keys" by William A. Clark, IV., et al., Pat. No. 3,651,483, "Method and Means for Searching a Compressed Index" by William A. Clark, IV., et al., Pat. No. 3,613,086, "Compressed Index Method and Means with Single Control Field" by Edward Loizides and John R. Lyon; Pat. No. 3,643,226, "Multilevel Compressed Index Search Method and Means" by Edward Loizides, et al; Pat. No. 3,603,937, "Multilevel Compressed Index Generation Method and Means" by Edward Loizides, et al.; Pat. No. 3,602,895, "One Key Byte Per Key Indexing Method and Means" by Edward Loizides; Pat. No. 3,646,524, "High Level Index Factoring System" by William A. Clark, IV., et al.; and allowed application Ser. No. 99,863, "Multilevel Compressed Index Insertion and Deletion Method and Means" by Edward Loizides, et al.

All of the above applications are owned by the assignee of the subject application.

The above applications apply to different inventions in the area of compressed indices. The subject specification also can be applied to the area of compressed indices. The term "directory" in the subject specification can be used with a similar meaning to the term "index" as used in the prior cited applications. The work index is used in the subject application in the addressing sense commonly found in the computer arts, i.e., index register, etc. The index in any of the prior cited applications operates in a serial manner in which accessed items contained in the directory can properly be called compressed indices. The subject application does not use a serial search and its entries are not considered compressed indices. However indexing of another type is used in the directory of the subject invention as an intermediate step in its non-sequential type of operation.

Some operational distinctions between the subject invention and the inventions in the prior cited specifications are: The subject invention can provide a directory which can be searched in a binary manner, while the prior cited inventions search an index block in a serial manner. Thus the subject invention can search its directory by reading not more than log N entries, while the prior inventions search a compressed block of the same size (i.e., representing N-keys) by reading up to all N-entries.

The subject specification can provide a machine-useable directory in which each entry can have fixed size regardless of the length or variability of the keys, or other items of information, represented. Prior compressed indices (except U.S. Pat. No. 3,613,086, "Compressed Index Method and Means with Single Control Field" by Edward Loizides and John R. Lyon) had variable length entries. However U.S. Pat. No. 3,613,086 was searched sequentially while the subject invention is searched binarily.

The subject application enables relatively easy and fast insertion and deletion of entries without requiring any shifting of non-changed entries in a block, such as insertion and deletion by the invention in Ser. No. 99,863. Insertion by the subject invention can always be done by catenating entries to the end of a block; and if any space is vacated (i.e., by deletion) anywhere in a directory block, it can be used for insertion. The subject invention maintains the logical sequence of keys within a block without regard to their physical sequence. Insertion anywhere in a block by the subject invention is not impeded by the physical sequence of the keys represented in the block.

UTILITY AND OBJECTS

A primary example of use described for the embodiments herein is to enable an electronic computer system to obtain and maintain a directory of records represented in the system by their respective keys. The records will normally be on I/O devices at random locations which are identified by their keys.

Another use of the directory by the computer system is for finding system control programs or application programs, by using the invention with a dynamic catalog of programs. For example, a catalog directory may be generated and searched by this invention using input keys which are names of the programs in the system. As a result, each key in the directory represents a different computer program name, and the content of a sink in the directory has stored within it the actual I/O or memory address to indicate where the program is currently stored. The content of the directory sink representing the given program name may be changed whenever the program is moved to another location such as into main store, so that the sink content can reflect a main stored address in preference to an I/O address where the same information may be obtained. Furthermore if the directory size of the sink entries permit, both the main memory and the I/O addresses may be concurrently accommodated within the content of that sink. In the latter case, the directory can be searched using the name for a given program to find whether or not that program is in main memory without requiring any access to I/O; this provides a "lookaside" memory operation.

Still another use for the invention is to control the allocation of buffers in the main memory of a computer, i.e., blocks or pages in a randomly accessible memory. The situation where each buffer location has a unique identifier (which may be buffer name, real memory address, or virtual memory address) is notoriously well-known in the art, i.e., IBM OS/360 and TSS/360 programming systems. By the invention generating and searching the disclosed directory using such buffer names as the input keys, the identifiers of the buffer locations are then represented by the sinks in the directory. Furthermore, the sink addresses in the directory may be dynamically changed at the end of each search of the tree, i.e., the content of the sink can then be changed to the new address each time a buffer is assigned to a particular location in main memory. The change in the sink contents in the directory is done by techniques not pertinent to the subject invention, such as by the dynamic address translation techniques currently being commercially used in such machines as the IBM S/360 model 67 for the assigning of a real address to a given virtual address. After such assignment, the buffer may be accessed by searching the directory with the buffer name(i.e., virtual address) as a search argument to retrieve the real address of the buffer (which is the content of the sink found with the search); and the real buffer currently assigned the particular real address is thereby accessed for a reading or writing operation.

Also an important security use is obtained with the invention when it is used for cataloging program names or any other information which is to be represented by the sinks in its directory. The reason for the security is that the names (or other information being cataloged by the directory) does not in fact appear within the directory. The inner vertex and sink representations in the directory are insufficient to reconstruct the information represented by them. A further security measure can be taken to prevent discernibility between sinks and inner vertices in a memory dump of a directory, which may be discernible when the sinks use a common type of address representation. This can be done by representing the sinks in a special way; it comprises Exclusive-O-Ring the content of each sink row with the content of its predecessor row, and storing the result into the sink row as the content of the sink. During any search of the directory, the actual sink can be easily recovered by Exclusive-O-Ring the content of the sink row found by the search with the content of its predecessor vertex row found during the same search.

A particularly effective security advantage is gained with the invention's use of invertible edges with the inner vertices in its directory, in which case it is imperative that the address of the directory source be known in order to get any meaning whatsoever out of the representations in the directory. Consequently a high degree of security is obtained when looking at a storage dump of the directory, because the predecessor-successor relationship can not be established among the vertices represented by the rows appearing in the dump, since it is essential to have the absolute index of the predecessor of the current vertex being examined during a search before the successor can be found. This means that the storage dump can not reveal the real addresses of the sinks unless the person using the directory has the correct address of the directory source, which address is not found in the directory. The location of the source can be at any predetermined location and it need not be contiguous with the other rows in the directory, as long as its edge field is adjusted to locate its successor pair. Thus the source can appear anywhere within or outside the directory, and it is not necessary to relocate the directory when changing the location of the single row and the edge field in the source vertex representation. Hence the address of the source of a directory can itself be handled on a security basis, and security can be enhanced by changing the location of the directory periodically, such as once per day or once per hour, etc.

Also complete security can be obtained without moving the location of the source of the directory by Exclusive-O-Ring an arbitrarily chosen security code with the edge field in the source row. This security code would be Exclusive-0Red with the edge field prior to a search of the directory in order to establish the correct edge. Likewise this security can be periodically changed.

A special situation which often occurs with the invention when a directory is constructed with the same key representing a plurality of records. In such case, it is necessary to be able to distinguish among the different records represented by the key. This can be done in at least two different ways. The first way is by having the sink in the directory represent an address to an "equals" record which contains the addresses of all of the records identified by this same key. The different addresses in the equals record distinguish among the different records identified by the same key. The second way is to repeat the key once for each of its I/0 records, and by catenating a respective I/0 address to the end of each repetition of the key; in this manner a different key is obtained for each record identified by the same key to eliminate any duplication. The second way eliminates the need for an equals record. Typical inverted file organizations is well known in the art and is used with this form of directory.

Other objects of the invention are to provide:

1. A search method which is readily adaptable to hardware implementation in a computer system.
2. A search method which permits paths of different lengths to be searchable in an identical manner in the same directory.
3. An average search time which is proportional to $\log_2 N$, where N is the number of keys, or other information, represented in the directory.
4. A search that accesses entries non-sequentially in a directory under the control of a given search argument.
5. A search that makes a choice between precisely two alternatives at each decision point in the search.
6. A search in which the number of decisions executed during a search cannot exceed the number of bits in the search argument, and generally is less.
7. A search which uses a path vector concept based upon bits in the given search argument which are selected during the search.
8. A search which can be executed without having to access any portion of any key until the search is completed.
9. A search which does not depend upon the search argument being represented in the search tree in the directory, but will execute as if the search argument were in the directory.
10. A search which utilizes the successor pair adjacent location concept to access either successor with a single edge field representation from each vertex in the binary tree structure.
11. A search which can identify the existence of a sink when searching its predessor vertex, i.e., without accessing the sink which need not be in the directory.
12. A search which can operate with a directory having any one of plural edge representations, such as absolute index, offset, or invertible.
13. A search which can operate without dependence on the collating sequence used to generate the directory being searched.
14. A search that can trace a path in a directory representing any directed acyclic binary graph.

DRAWING DESCRIPTION

The foregoing and other objects, features and advantages of the invention will be apparent from the following more particular description of the preferred embodiments of the invention, as illustrated in the accompanying drawings.

Figure 1A:
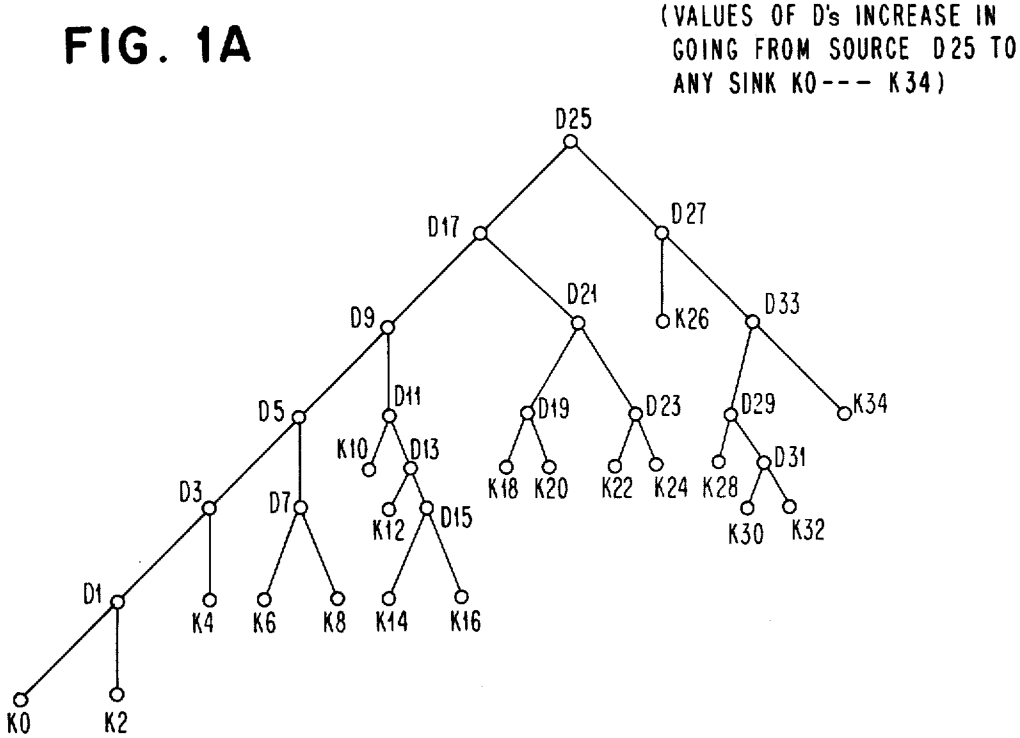
FIG. 1A shows a binary tree structure which is used by the subject invention in searching its unique directory.

In order to accommodate the reader, the following DEFINITION TABLE is provided of technical terms used in this specification:

DEFINITION TABLE

ASCENDING PATH PROPERTY:
: A property of values associated with vertices in a directed graph in which any sequence of values along a directed path is in nondecreasing order.

ARRAY:
: A multi-dimensional space having a predetermined reference location. Any location in the array is defined by a set of indices which represent the coordinates of the location with respect to the predetermined reference location. Each index in the set defines one dimension of a location with respect to the reference location. The set of indices is represented as a subscript on the array representation.

BINARY COLLATING SEQUENCE:
: A predetermined sequence of bytes in a set respectively representing alpha-numeric and special characters. The bits comprising each byte are considered as a binary number. The binary number values of the bytes increase when going from byte to byte through the predetermined sequence, e.g., EBCDIC and ASA character sets. Not all collating sequences are binary collating sequences, e.g., the BCD collating sequence. However any character set can be translated to a binary collating sequence.

BRANCH POINT:
: Any vertex in a graph except a sink.

CELL:
: An entry in a table, or a row in a matrix.

CELL:
: The address of a cell or row in a matrix.

CIRCUIT:
: A closed path in a graph, i.e., a path whose first vertex is also its last vertex. A DIRECTED CIRCUIT is an unidirectional closed path.

CONNECTED GRAPH:
: A graph in which every pair of vertices is connected by a semi-path.

COMPLETE SUBTREE ORDER:

A sequence, or ordering, of the vertices of a binary tree so that the vertices of the left subtree of any inner vertex appear first in the sequence (in complete subtree order), then the vertices of its right subtree appear next in the sequence (in complete subtree order), and then it (the inner vertex) appears in the sequence. In the binary tree of FIG. 0, the sequence of vertices in complete subtree order is (*d, h, i, e, b, f, g, c, a*). A sequence of values associated with the vertices of a binary tree is in complete subtree order when the corresponding sequence of associated vertices is in complete subtree order, as, for example, in FIG. 0 the sequence of values associated with the vertices in complete subtree order is (7, 9, 6, 4, 3, 1, 8, 2, 5).

DEGREE:

The total number of edges at a vertex regardless of their direction. INDEGREE is the number of incoming edges at a vertex. OUTDEGREE is the number of outgoing edges at a vertex.

D-INDEX:

Index to the highest-order unequal bit position obtained by comparing two adjacent keys in a sequence of sorted keys. D is the most recent generated D-INDEX while generating a directory. A LAST ACCESSED D-INDEX in a matrix need not be the LAST D-INDEX in the matrix. The index of the highest-order unequal bit position obtained by comparing any two keys in a set of keys is equal to the D-index obtained by comparing exactly one pair of consecutive keys in the sorted sequence of the same set of keys.

DIRECTED:

An adjective signifying unidirectionality.

EDGE:

A connection between a pair of vertices in a graph; it is shown as a line. A DIRECTED EDGE is an edge which defines a connection in only one direction; it is indicated by an arrowed line. An INCOMING EDGE is an edge directed to a vertex; every vertex except a source has an incoming edge. An OUTGOING EDGE is an edge directed out of a vertex; every vertex except a sink has an outgoing edge.

EDGE REPRESENTATION:

See section entitled "Edge Representations."

ELEMENT:

One of the members of a collection, or SET; a value located in a vector by subscripting, or a value located at the intersection of a row and a column in a matrix; one of the members of a sequence.

GRAPH:

A set of vertices connected by edges. A DIRECTED GRAPH is a set of vertices connected by DIRECTED EDGES. A CYCLIC GRAPH is a directed graph containing at least one directed circuit. An ACYCLIC GRAPH is a directed graph containing no directed circuit. An EDGE LABELED GRAPH is a graph in which every edge has a label. A CONNECTED GRAPH is a graph having at least one semi-path from each vertex to every other vertex. An UNCONNECTED GRAPH is a graph having at least one pair of vertices not connected by any semi-path.

INDEX:

A position indicator along one dimension of a vector, matrix, or array. It is represented as a subscript on the vector, matrix, or array representation. An index is always relative to the first element of an array, and can be considered as a relative address.

LABEL:

An integer associated with a vertex or edge in a graph.

LABEL CLASS:

A collection of label sets, all being associated with the same graph.

LABEL SET:

A collection of labels associated with all vertices, or all edges in a graph.

LABELED GRAPH:

A graph in which the vertices are identified with a set of labels or numbers in some manner. Usually the labels are the first $v$ nonnegative integers, i.e., 0, 1, 2, . . . , $v-1$, where $v$ is the number of vertices in the graph.

Figure 0:
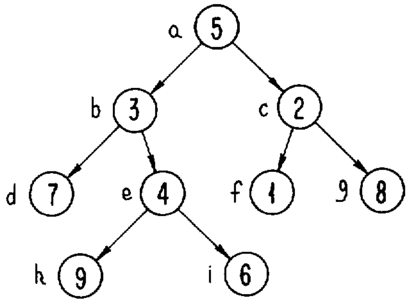
FIG. 0 is used in the DEFINITION TABLE in certain definitions, such as "left list order," "left subtree order," "subtree," "successor pair," etc.

LEFT LIST ORDER:

A sequence of vertices in a binary tree, where the source of every subtree of the tree occurs immediately before every vertex in its left subtree, and every vertex in its right subtree appears next in the sequence. The vertices of a binary tree (or subtree) may be labeled (or numbered) in left list order by numbering the source first, then numbering all vertices in its left subtree (in left list order), then numbering all vertices in its right subtree (in left list order). A sequence of values associated with the vertices of a binary tree is said to be in LEFT LIST ORDER when the sequence of vertices corresponding to the values is in left list order. For example, the sequence of vertices in the binary tree shown in FIG. 0 is (*a, b, d, c, h, i, c, f, g*).

LEFT SUBTREE: See SUBTREE.

LEFT SUBTREE ORDER:

A sequence of vertices in a binary tree in which all vertices in the left subtree of an inner vertex $x$ appear in the sequence before $x$, in left subtree order, then $x$ appears in the sequence, then all vertices in the right subtree of $z$ appear in the sequence in left subtree order. For example the vertices of the binary tree shown in FIG. 0 in LEFT SUBTREE ORDER are (*d, b, h, e, i, a, f, c*, and *g*). The sequence of values associated with the binary tree of FIG. 0 is (7, 3, 9, 4, 6, 5, 1, 2, 8).

MATRIX:

A two dimensional array. A TABLE can be represented as a matrix. The location of any ENTRY in a TABLE can be represented by two indices.

NODE:

A branch point in a graph.

ORDER:

The arrangement or sequence of objects in position or of events in time.

ORDERED PAIR:

A predefined sequence of two members.

PATH:

A sequence of connected edges in a graph, i.e. the end point of each edge in the sequence is the initial point of the next edge in the sequence. A SEMI-PATH is a sequence of edges in a graph where the two edges comprising any consecutive pair in the sequence have at least one vertex in common. A PATH is a semi-path, but a semi-path may fail to be a path. For example, in FIG. 0 the sequence of edges ((*a, b*), (*b,e*), (*e, i*)) is a path, and is also a semi-path, but the sequence of edges ((*d, b*), (*b, a*), (*a, c*)) is a semi-path, but not a path. Thus the edges in a path are always oriented in the direction of the path, whereas the directions of the edges in a semi-path are not important; only the connectedness of consecutive edges is important.

PREDECESSOR:

A vertex immediately preceding another vertex. Vertex A is a predecessor of vertex B if the directed edge goes from A to B in the graph. Predecessor is the reverse of successor.

RELATED SUCCESSOR: See SUCCESSOR PAIR.

RIGHT SUBTREE: See SUBTREE.

SCALAR:

A single dimensionless quantity (as opposed to an array).

SEARCH TREE:

A directed binary tree used for searching for an element of a given set, S, of elements. The vertices in a search tree are subsets of the given set, S. The two successors of a given subset of S are two nonempty sets having no element in common and whose union is their predecessor set. The sinks in a search tree are, or correspond to, one-element subsets of S. The set S corresponds to the source of the search tree.

SEQUENCE:

A mapping or correspondence of the nonnegative integers to the elements of a set; each nonnegative integer has one of the elements of the set associated with it, and if the elements are listed in this order they form a SEQUENCE.

SEMI-PATH: See PATH.

SET:

A collection of elements having some feature in common or which bear a certain relation to one another.

SINK:

A vertex with no outgoing edge. A TREE SINK is the last vertex in a binary tree along any path from the TREE SOURCE. A SUBTREE SINK is the last vertex in a binary subtree along any path from the SUBTREE SOURCE. For example, in FIG. 0, vertices *d*, *h*, *i*, *f*, and *g* are sinks.

SOURCE:

A vertex with no incoming edge. For example, in FIG. 0, vertex *a* is the source of the binary tree shown in FIG. 0.

SUBGRAPH:

A graph A is a subgraph of a graph B if the vertices and edges in A are subsets of the vertices and edges of B respectively.

SUBSCRIPT:

A number(s) specifying an index(s), or coordinate(s), in a vector, matrix, or array. It may be multidimensional, in which case the position of each index in the subscript corresponds to a particular dimension in an array. The subscripts for the various dimensions of an array are placed in square brackets after the name of the array, and are separated by semicolons inside the square brackets.

SUBSET:

A set A is a subset of a set B if all of the elements of A are also elements of B.

SUBTREE:

A connected subgraph of a tree. A subtree is itself a tree. For example, in FIG. 0, the graph formed by vertices *b*, *d*, *h*, and *i*, and the edges (*b*, *d*), (*b*, *e*), (*e*, *h*), and (*e*, *i*) is a subtree of the binary tree shown in FIG. 0. LEFT SUBTREE: The LEFT SUBTREE of an inner vertex *x* in a directed binary tree is the subtree having the left successor of *x* as its source. The left subtree of *x* does not include *x* as a vertex. For example, in FIG. 0 the left subtree of vertex *a* is the subtree composed of vertices *b*, *d*, *e*, *h*, and *i*, and edges (*b*, *d*), (*b*, *e*), (*e*, *h*), and (*e*, *i*). RIGHT SUBTREE: The RIGHT SUBTREE of an inner vertex *x* in a directed binary tree is the subtree having the right successor of *x* as its source. The right subtree of *x* does not include *x* as a vertex. For example, in FIG. 0 the right subtree of vertex *b* is the subtree composed of vertices *e*, *h*, and *i*, and edges (*e*, *h*), and (*e*, *i*).

SUCCESSOR:

Any vertex immediately following another vertex. Vertex B is a successor of vertex A if there is a directed edge going from A to B in the graph. For example, in FIG. 0, vertex *b* is a successor of vertex *a*, vertex *f* is a successor of vertex *c*, etc.,

SUCCESSOR PAIR:

The pair of successors to a vertex in a directed binary tree. To distinguish the two successors, one is called a LEFT SUCCESSOR and the other is called a RIGHT SUCCESSOR. For example, in FIG. 0, the LEFT SUCCESSOR of vertex *b* is vertex *d*, and the RIGHT SUCCESSOR of vertex *b* is vertex *e*. A RELATED SUCCESSOR of a vertex *x* is the other vertex in the successor pair containing *x*. A related successor of a vertex *x* and the vertex *x* comprise a successor pair. For example, in FIG. 0 the related successor of vertex *b* is *c*, and the related successor of *c* is *b*.

TREE:

A connected, undirected graph without circuits. A tree is a graph with exactly one path connecting any two vertices in the graph. A DIRECTED TREE is a directed graph whose corresponding undirected graph has no circuits. A DIRECTED BINARY TREE is a directed tree with every vertex having an OUTDEGREE of either zero or two. A directed binary tree is shown in FIG. 0.

UNDIRECTED:

An adjective signify bidirectionality.

UNDIRECTED GRAPH:

A graph in which every edge is bidirectional A graph formed from a directed graph by making all edges bidirectional is called the UNDIRECTED GRAPH corresponding to the DIRECTED GRAPH.

UNDIRECTED TREE:

An undirected graph with no circuit.

VECTOR:

A one dimensional array.

VERTEX:

A node, or point, in a graph or tree. An INNER VERTEX is a vertex with at least one outgoing edge; any vertex except a sink. For example, in FIG. 0, the inner vertices are *a*, *b*, *c*, and *e*.

VERTEX LABELED GRAPH:

A graph in which every vertex has a label.

VERTICES:

Plural of vertex.

In order to enable the reader to better understand the search invention described and claimed in this specification, an understanding of the structure of the directory is essential. This is best gained by understanding how the directory is generated. Therefore the next several sections are provided about the directory generation and structure as preliminary to describing the search invention.

DIRECTORY GENERATION

The subject invention searches a directory generated by mapping a sorted sequence of input keys, and indices derived therefrom, into a directed binary tree, such as shown in FIG. 1A. In the binary tree, the sequence of keys are represented as sinks K0 through K34, each having an even number, and the inner vertices are derived therefrom and are represented as D-indices, D1 through D33, each having an odd number.

Figure 1B:
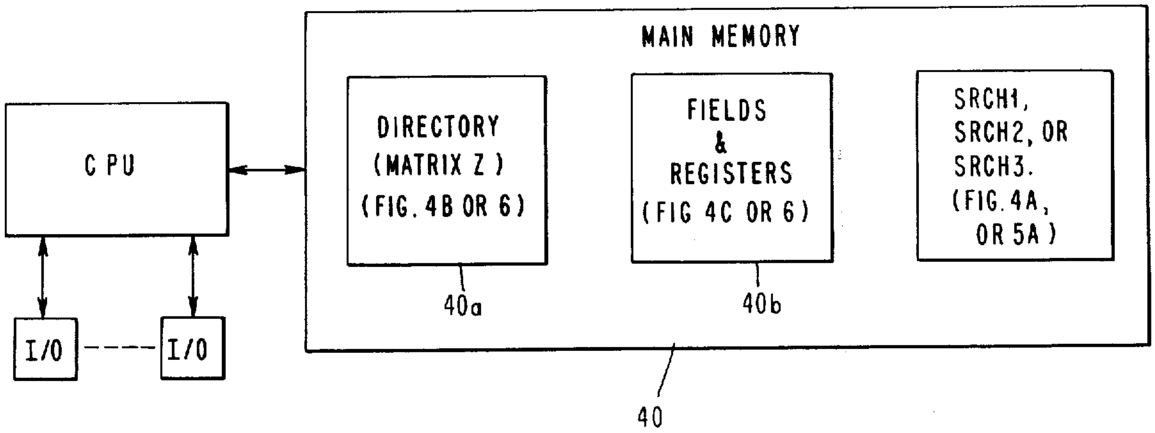
FIG. 1B illustrates a computer system which is organized to contain the subject invention.
Figure 1C:
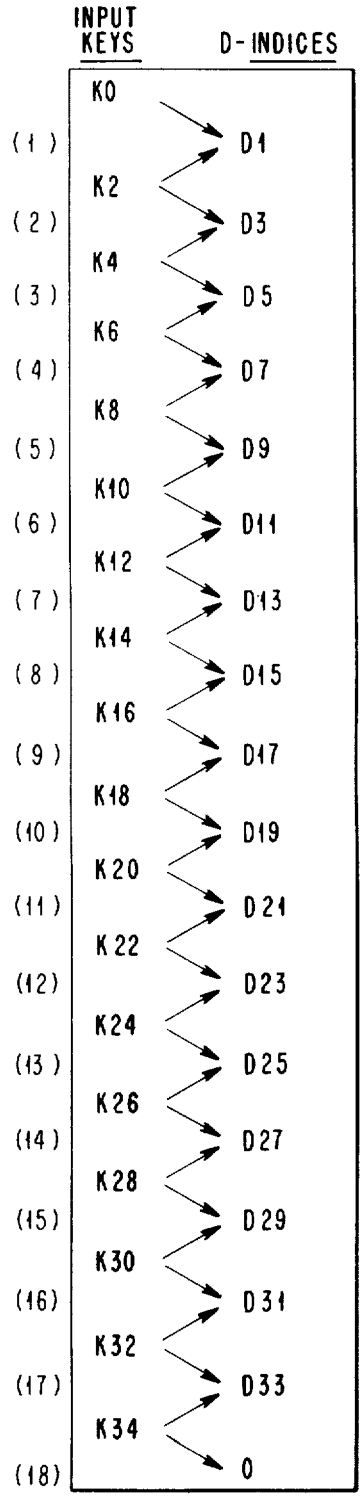
FIG. 1C illustrates a sequence of input keys and the resulting D-indices used in the construction of a unique type of directory which is searched by the subject invention.

FIG. 1C illustrates the sequence of sorted keys K0 . . . K34, and it represents any sequence of keys (derived from any source) sorted by the values of its characters according to any chosen character set represented by a binary collating sequence. There may be any number of keys in the sequence, and for convenience they are labeled with even numbers in their sorted sequence. An ascending sequence may be assumed for the values of keys K0 – K34 throughout this specification, and it will be apparent that the invention is just as applicable to a descending sorted sequence of keys.

In FIG. 1A, the sorted relationship among the keys K0 . . . K34 is represented by the left-list order for the sinks in the binary tree, i.e., in FIG. 1A they are in ascending sequence when scanned from left to right, which is a counterclockwise sequence about the source vertex, labeled D25. The keys will be in descending sequence if scanned in the reverse direction, i.e., from right-to-left, which is clockwise around the source.

The D-indices of the tree in FIG. 1A are generated from any sequence of sorted keys K0 . . . K34 by comparing respective pairs of adjacent keys in the sorted sequence in the manner shown in FIG. 1C, starting with the first pair, K0 and K1.

The generation of each D-index is done by comparing adjacent keys beginning with the highest-order bit position in both keys, and continuing by comparing bits at sequentially lower-order bit positions until the first unequal pair of bits is found. The first unequal bit position represents the D-index for the compared pair of keys; and its value is the number of equal bit positions in the pair of keys from their highest-order bit position to, but not including, the highest-order unequal bit position. Thus at some point in the comparison there will be an unequal pair of bits. If all bits in a key are equal, the bit after the end of a key is by definition an unequal bit position.

The D-indices are shown in FIG. 1C with the label D appended to an odd number, which is sequenced between adjacent even numbers labeling the compared keys. For example, the first D-index is D1 which is generated by a comparison between the first pair (1), which comprises keys K0 and K2. The value of D1 is the highest-order difference bit position in that key comparison. Then the next pair (2), which comprises keys K2 and K4, are compared to generate the next D-index, D3. The process of key comparison and generation of D-indices continues until the last pair (17), which comprises keys K32 and K34, are compared to generate the last real D-index, D33. Then at operation 18 (which is not a comparison), a final unreal D-index, which is a zero, is inserted; and with the addition of this unreal D-index, there will be the same number of entries in the D-index list as there are keys in the input sequence. The unreal D-index does not appear in the directed binary tree in FIG. 1A.

GENERAL BINARY TREE MAPPING

As previously mentioned, the directory generation process described in this patent specification is based on a mapping of D-indices and keys into a directed binary tree, such as represented in FIG. 1A. Hence the searching is dependent on the way the binary tree is represented in the directory. The mapping operation uses the value relationship among the D-indices to map them into an ascending sequence along each path in the directed binary tree from its source, D25, to any sink, K0 through K34.

The values of the D-indices are in ascending sequence along any path in the directed tree, even though the D labels are shown in descending sequence along the same path in FIG. 1A. This sequencing difference between values and labels of D-indices along any path is due to the different functions that they provide; The "D labels" represent the order in which the "D-indices" are derived from the input stream of keys; while the D-values represent the order in which the D-indices are mapped into the binary tree along a path from the source to a sink.

The "D Labels" and "K Labels" constitute a labeling of the vertices of a binary tree in left subtree order, i.e. a labeling of the vertices so that for any vertex, the labels of vertices in its left subtree are all smaller than its label, and the labels of all the vertices in its right subtree are greater than its label. The mapping of a binary tree as disclosed in this specification applies the ascending path property to any binary tree which is labeled in left subtree order.

An example of a mapped path is from source D25 to sink K4, the encountered D-indices are D25, D17, D9, D5, and D3, in which the value of D25 is less than D17, which is less than D9, which is less than D5, which is less than D3. The value relationship among the D values in each path in the directed tree in FIG. 1A can be expressed by the following inequalities:

D1>D3>D5>D9>D17>D25.
D7>D5>D9>D17>D25.
D15>D13>D11>D9>D17>D25.
D19>D21>D17>D25.
D23>D21>D17>D25.
D31>D29>D33>D27>D25.

By knowing that the values of the indices must have this nondecreasing relationship from the source, which may be called the "ascending path property," the invention can generate a directory from a set of sorted input keys that will completely represent a mapped directed tree structure which will be unique for a given set of input keys. The invention depends upon the fact that the tree it generates has the ascending path property.

This generating method builds a directory of vertices in machine-readable binary form by relating the values of the D-indices generated in the sequence shown in FIG. 1C to paths in a directed binary tree. Certain intermediate operations of a complex nature are performed to establish the relationship of D-indices in order to build a directory. Much of this specification is devoted to explaining these intermediate complex operations.

GENERAL DESCRIPTION OF DIRECTORY

Figure 1D:
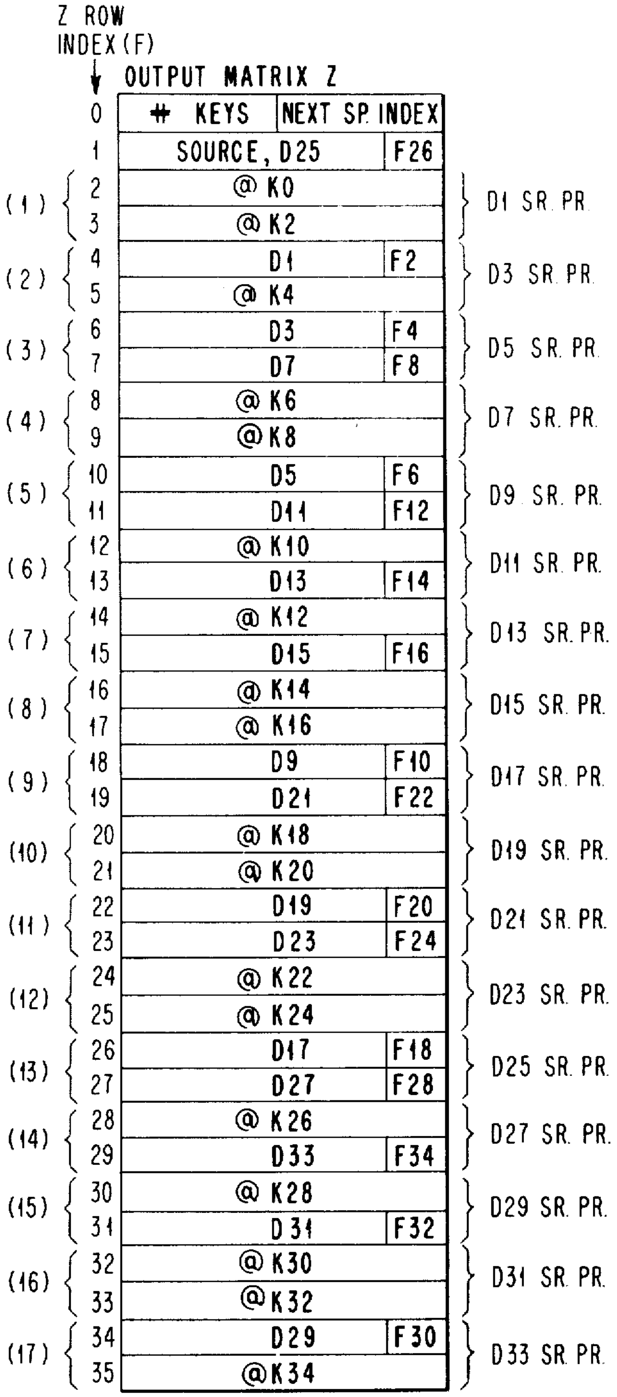
FIG. 1D shows a directory having absolute indices which may be searched by the invention.

As shown in FIG. 1D, the initial pair of rows in the directory is reserved for initial parameters and a source vertex of the binary tree in matrix Z. The initial parameters are provided in these predetermined locations for future use in searching the directory, so that any search can obtain the source vertex in a predetermined location. The first row contains two entries, which are the total number of keys (sinks) in the directory, and the next assignable space address in matrix Z. The total number of rows in matrix Z is twice the number of input keys, N. This knowledge can be used in advance to precisely determine and reserve a space needed to hold the directory before it is generated. This space allocation function is simplified by having fixed length entries for the respective items to be inserted into output matrix Z. It is found in practice that having fixed length rows of 32 bits in matrix Z does not restrict the directory in any practical sense because it permits handling a data set having a number of keys of up to 2 to the 32 power, i.e. 4,294,967,296 keys, which is an extraordinarily large file when it is understood that each key can represent a different data record in a data base. For reasons which will become apparent later, a field within the row may store a D-index, and if this field is only 11 bits, it can accommodate a D-index generated from keys having a bit length of up to 2048 bits, which corresponds to a length of up to 256 bytes of 8-bits.

This key length is considered more than adequate in practicing the invention. Even key lengths greater than 256 bytes can be accommodated by the 11 bit field as long as their D-indices do not exceed the 11 bit field. As a result, any directory with one header row will have precisely two words (i.e., totaling 64 bits) for each input key, regardless of the number of input keys provided, and regardless of the actual lengths of the respective keys, i.e., total rows in directory = 2N.

HARDWARE CONFIGURATION FOR GENERAL COMPUTER

FIG. IB shows a hardware configuration of the invention adapted to any general purpose digital computer. Anyone currently skilled in the art of programming one or more types of digital computers currently available on the commercial market will be able to program the subject invention directly from the method descriptions given in this specification, and this has been done. Any computer engineering development group with experience in designing hardware for computer systems, including computer central processing units (CPU's) will be able to reduce to a hardware level, with the use of ordinary skill in the art, any of the methods described in this specification.

FIG. IB represents a specific digital computer hardware system tailored to use the subject invention. The matrix fields and registers shown in FIG. IB are physically operated areas in the main memory of the system in the form described, or to be described, in this specification. The programs shown in another area of main memory are the machine coding of the methods shown in FIGS. 4A, 5 and 5A; anyone skilled in the related programming arts should be able to do this within a relatively short time after studying this specification.

Figures 4A, 4B, 4C:
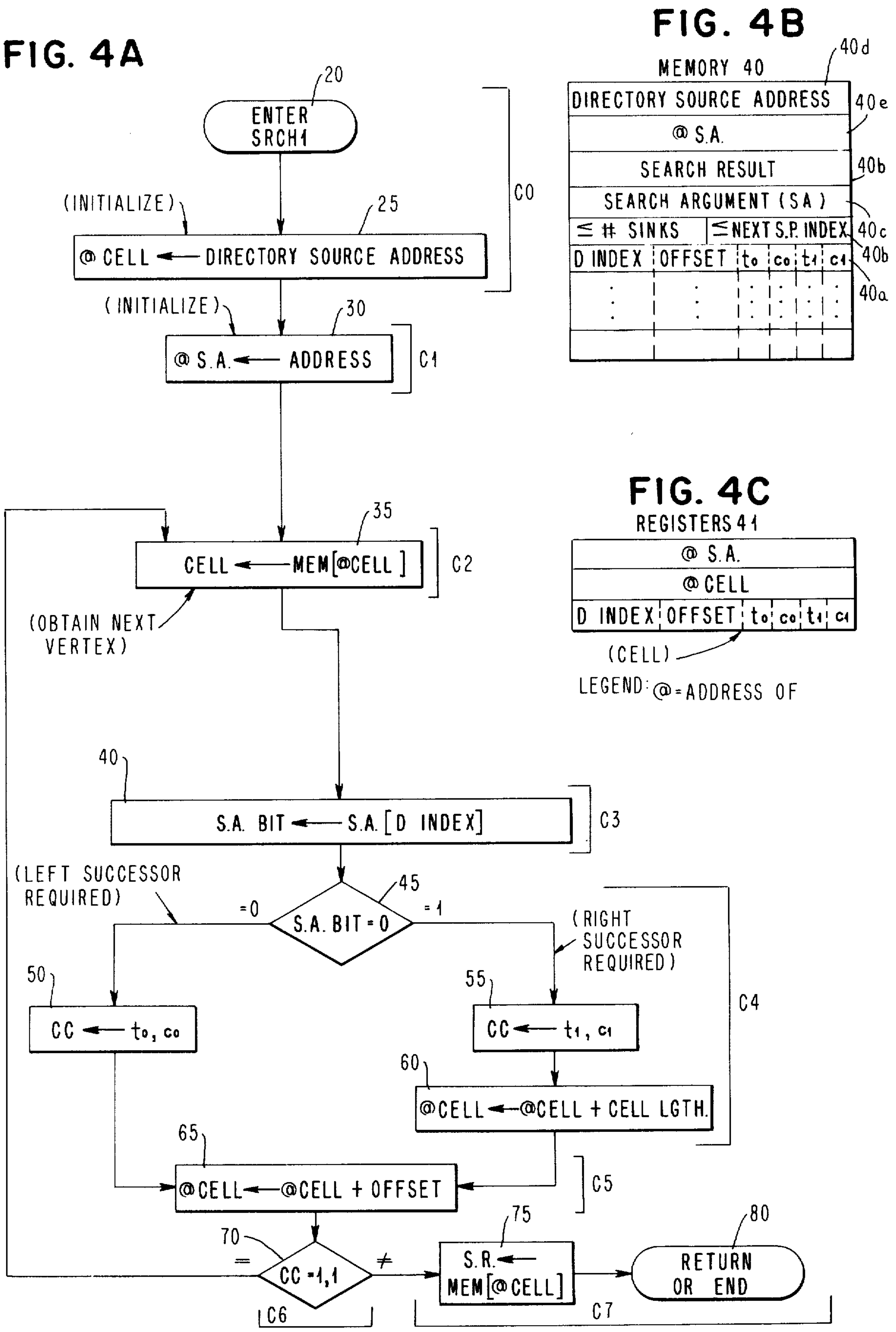
FIGS. 4A, 5A and 5B illustrate search methods which provide embodiments of the subject invention.
FIGS. 4B and 4C illustrate a directory, fields, and registers which may be used by the embodiment in FIG. 4A.

Furthermore, the special purpose hardware arrangement in FIGS. 7, 8, 9 and 10 executes the method in FIG. 4A, called SRCHl.

MATRIX FORM AND TERMINOLOGY

The notation used herein with respect to the entries in matrix Z, which receives the directory, is that commonly found with programming languages such as APL/360 or ALGOL, in which any entry in a matrix can be identified by a subscript notation in brackets to the right of the symbol identifying the matrix. The subscript locates a field within its matrix by specifying the dimensions of that field. Each dimension within the subscript is separated by a semi-colon. In the case of the two-dimensional matrices used herein, the number to the left of the semi-colon within the brackets identifies the row dimension in the matrix, while the number to the right of the semi-colon within the brackets identifies the column in the matrix being referenced. Hence any field within the matrix can be specified by this notation, for example Z[R;*d*]in which R is the row dimension and *d* is the column dimension. Zero-origin numbering is used for the dimension notation, i.e., the first row at the top of the matrix is zero and the first column on the left in the matrix is zero. This notation is used in a book by K. F. Iverson entitled "A Programming Language" published in 1962 by Wiley.

Figures 5A, 5B, 6:
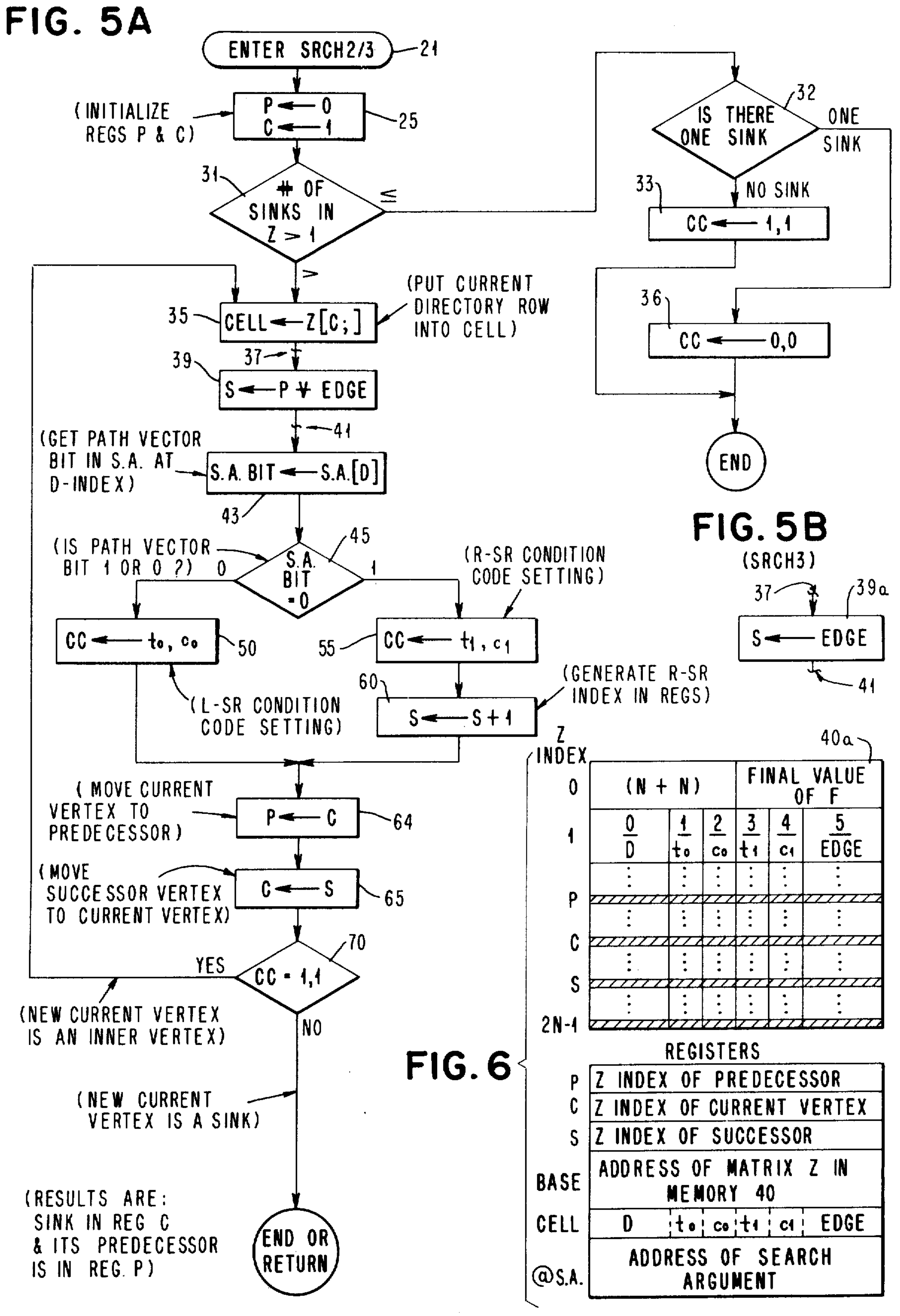
FIG. 6 illustrates fields, registers and a directory which may be used by the embodiments in FIGS. 5A and 5B.

Thus in FIG. 6 the respective entries are shown with their subscript notations, in which the left-most entry D in the row one is Z[1;0] and the right-most item EDGE in the same row is Z[1;5]. Thus it is seen in the last example that the left-most one in the bracket represents the row 1, and the right-most number within the bracket represents column 5 to define a specific field Z[1;5] in that row.

Also any entire row or entire column may be referenced by not putting any representation for the non-specified dimension. For example Z[3;] refers to the entire row 3 of matrix Z as a single field; and Z[1;] refers to the entire column 1 of matrix Z as a field. A row in matrix Z contains a cell of the directory.

Matrix Z is illustrated in FIG. 6 with six columns and 2N number of rows. The number of rows in matrix Z is determined by the number of input keys which are to be represented in the directory to be constructed within matrix Z. Given N number of input keys, there will be precisely 2N−1 number of entries in matrix Z to hold the directory for N number of keys, plus the number of header rows of which one is shown in FIG. 6.

Also in this specification any entry within a matrix may be represented in a second way in addition to the programming language notation just described. The other is specified by a symbol tailored to represent the entries in a particular column. For example, the FIG. 6, the symbols $t_0$, $c_0$, $t_1$, $c_1$, are used to represent respective one-bit fields in each row at the same respective column positions, which may be represented as Z[;1,2,3,4]. FIG. 6 also illustrates the use of the same specialized column symbols, and also has additional column symbols D and EDGE, which may also be represented as Z[;0] and Z[;5] respectively. The programming language notation more precisely identifies fields in a matrix since row identification is provided, which are essential in a machine addressing sense, since all of these matrices are intended to describe machine-controlled functions in the main memory of a computer system, such as an IBM S/360 or S/370 data processing system.

EDGE REPRESENTATIONS

An "EDGE" representation is provided with each inner vertex in a directory to represent the connection between a predecessor vertex and its pair of successors in a binary tree. In FIG. 1D the "absolute" edge representation is provided with each inner vertex as an F-value with each D-index within a single row in matrix Z. The F-value is the row index in matrix Z, and therefore the F-value is always relative to the address of row 0 in matrix Z representing an inner vertex. The address of Z row 0 is the address of matrix Z in a computer system. Hence the absolute edge means an edge with an "absolute index" in the directory, and it does not mean an absolute address. Thus in digital computer use, the "absolute edge" value is relative to a base address.

For a number of reasons, the Z-index value may not be the optimum form of an edge representation in a directory. The future use of the directory will dictate the optimum form of the edge representations. Ease of searching along paths in the directory is a primary consideration for the use contemplated for the directory. Accordingly the edge representations may be designed to optimize the tracing along any path in the directory.

With the Z-index values used in FIG. 1D, it is necessary to add the absolute address of row 0 in matrix Z to each F-value before the successor row can be accessed in the memory of most digital computers, since most current computers have an addressing relocatability feature for loading code into their main memory. In such case, the address of Z row 0 would normally be supplied as a value in a base register, or the equivalent.

An alternative edge representation is an "offset" field, which may be provided instead of the F-value (i.e., absolute edge) with each D-index entry in the directory. The offset represents the number of rows between an inner vertex (i.e., D-index) entry and its successor pair; in this case, offset = F-value with left successor-F-value with the current entry. Since the successor field in FIG. 1D may be either above or below the predecessor entry, the offset edge representation may be either minus or plus, respectively; minus refers to a successor entered into matrix Z before its predecessor, i.e., the current entry; and plus refers to a successor entered into matrix Z after its predecessor, i.e., current entry. Hence the offset directly represents the edges to a successor pair in terms of the row distance in matrix Z between the successor-pair and its predecessor.

A third type of edge representation for a successor pair is an invertible edge to a successor pair of a current entry being generated.

The invertible edge representation derives its utility from the fact that it provides a single value which can operate bidirectionally as an edge either to its predecessor or to its successor pair. The invertible edge representation can take many different forms which will obtain the bidirectional edge characteristic. In all forms, the invertible edge representation for a current vertex in the directory is derived from an operation on the index of its predecessor and the index of its successor pair. The recovery of either the predecessor index or the successor pair index, when given the other, is done by using the inverse operation of the operation used during generation of the edge representation. For example the inverse operation of addition is subtraction, dividing is the inverse of multiplying, Exclusive-ORing is its own inverse operation, etc.

In general, any operation that forms what is called in mathematics a ring is a preferred operation, and any such operation can be used with the subject invention. Also any operation that in mathematics forms a group may be used for this purpose, and can be used with the subject invention.

The Exclusive-OR operation is preferred for edge generation by a computer system because the Exclusive-OR is one of the fastest computer operations, and it is its own inverse operation.

Other invertible edge representations can be used with the subject invention, such as representing the edge by storing in the edge field the result of: (a) adding the predecessor index with the index of the successor pair, (b) multiplying or dividing the predecessor index with the successor pair index, or vice versa, (c) subtracting the predecessor index from the successor pair index, or vice-a-versa, etc.

The invertible edge, E, for a current entry may be derived by Exclusive-ORing the Z index (ZLS) of its left successor with the Z index (ZPP) of the predecessor of the current entry, i.e., the current entry intervenes in the levels within the binary tree between its predecessor and its left successor, $E = ZLS \veebar ZPP$. The invertible edge technique has advantages useful in searching a directory by the ease in which it allows a path to be traced in either direction along a directed path in a binary tree. In a computer relocatable memory environment, the invertable edges in a directory do not change, but only the base address of the memory section changes.

Figure 2A:
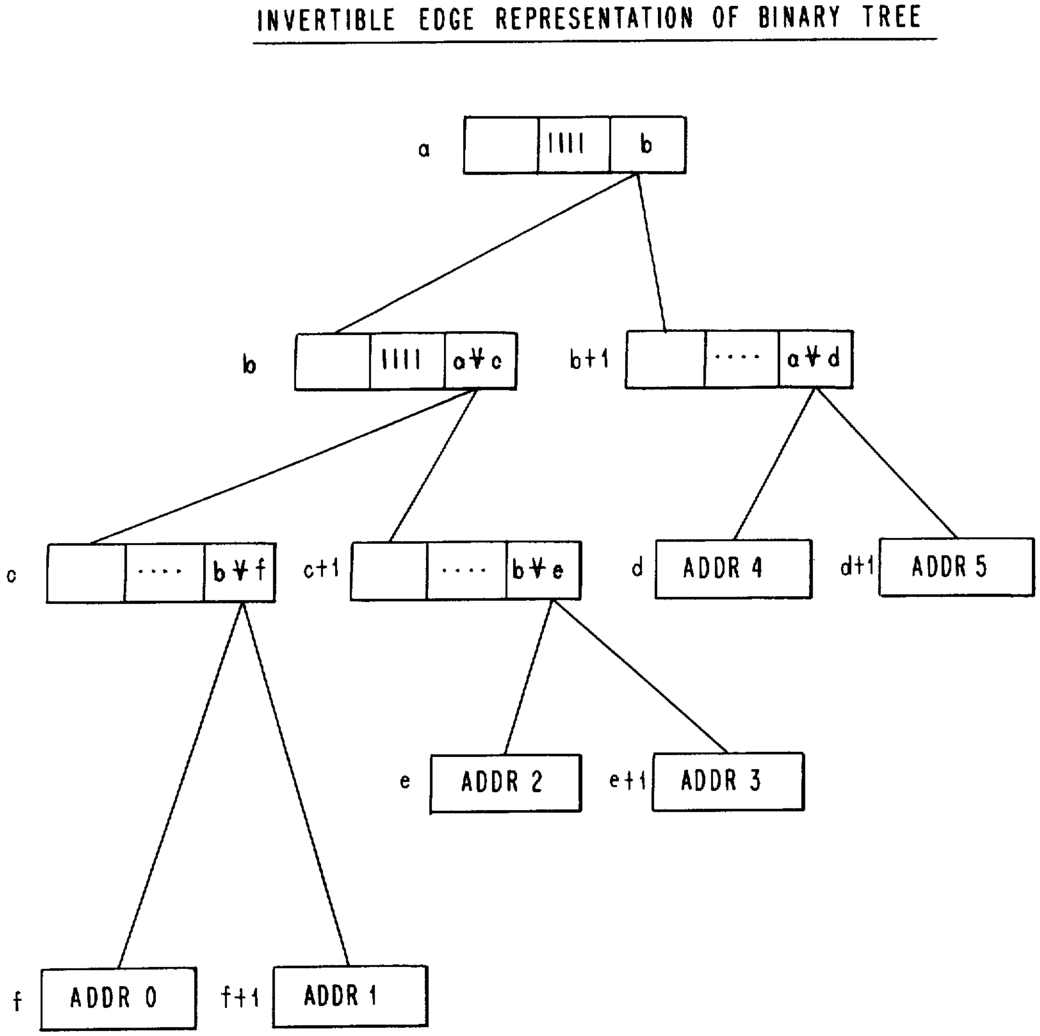
FIG. 2A is an example of the invertible edge type representation in the binary tree structure used by the invention.
Figure 2B:
FIG. 2B illustrates the vertex format used in the binary tree structure shown in FIG. 2A.

FIG. 2A provides an example of a binary tree having invertible edges. FIG. 2B shows the names of the fields in each inner vertex in FIG. 2A with the rightmost field containing the EDGE which represents the two outgoing edges of the vertex. In FIG. 2A the vertices are shown with their outgoing edges connecting them into a binary tree arrangement, as is found with the vertex entries in the generated directory in matrix Z. The Z index for each vertex in FIG. 2A is shown at its left side, i.e., index *a* is for the source, indices *b* and *b*+1 are for its successors, indices *c* and *c*+1 are for the successors of the vertex at index *b*, etc. The sink vertices have an address within their content, which may be the address of a key.

In the invertible edge connected tree shown in FIG. 2A, the source's edge *b* nevertheless contains the absolute index of its successor pair. However all other inner vertices in the tree have an invertible edge. For example the vertex at index b has an edge value derived as illustrated therein, i.e., derived from $a \veebar c$, in which *a* is the Z index of its predecessor and *c* is the Z index of its successor. Likewise, the vertex at index *c*+1 has its edge value derived from $b \veebar e$; that is *b* is the Z index of its predecessor and *e* is the Z-index of its successor pair (which are sinks).

The invertible edge connected tree in FIG. 2A, for example, can be searched in either direction if the indices of any two sequential starting vertices in the path are known. In FIG. 2A, any path from the source can be traced, since the absolute index of the source is known, i.e., index *a*, and the next indices *b* and *b*+1 of the next vertex in any path are known from the edge field in the source, which contains *b*. The index of *c* can be determined from the invertible edge with the vertex at index *b*, i.e., $c=(a \veebar c) \veebar a$. The index of the next vertex also can be derived, i.e., $f=b \veebar (b \veebar f)$. In this manner, any path in the tree may be traced from source to sink by deriving the index for each next vertex in the path to locate it, and then to obtain its invertible edge for deriving the next vertex index, etc.

Any path can be traced in the backward direction (i.e., from sink to source) using the same method, when the index of any sink and its predecessor are known. For example, if indices *f* and *c* are known, indices *b* and *a* can be derived; thus, $b=f \veebar (b \veebar f)$ and $a=c \veebar (a \veebar c)$.

Accordingly, if the path is first traced from the source to any sink (during which the indices derived for the sink and its predecessor are stored), the same path can be retraced in the backward direction; this type of backward retrace is used in one of the insertion methods, called INS2.

A conversion can be made of edge representations from the Z index form shown in FIG. 1D to either the offset form or the invertible form. This can be done by tracing out all paths in a directory using a left-list scan. The offset, or invertible edge representations can be generated as the scan obtains the F-values down each traced path. Each generated offset, or invertible edge representation is then substituted for the corresponding F-value edge representation in the directory in FIG. 1D. When this substitution is completed, the entire directory is then converted to the other type of edge representation. It is invertible that each offset edge generation requires only two levels of Z-indices within the binary tree, but that each invertible edge generation requires three levels of Z-indices within the binary tree.

Of course, the generation process itself can be modified so that the edge representations are concurrently being placed into the directory as it is being generated; and this is done in the embodiment of FIGS. 6B and C for the offset form, and in the embodiment of FIGS. 6D and E for the invertible form.

GENERAL FLOW DIAGRAM OF DIRECTORY CONSTRUCTION WITH ABSOLUTE EDGE

Figure 3A:
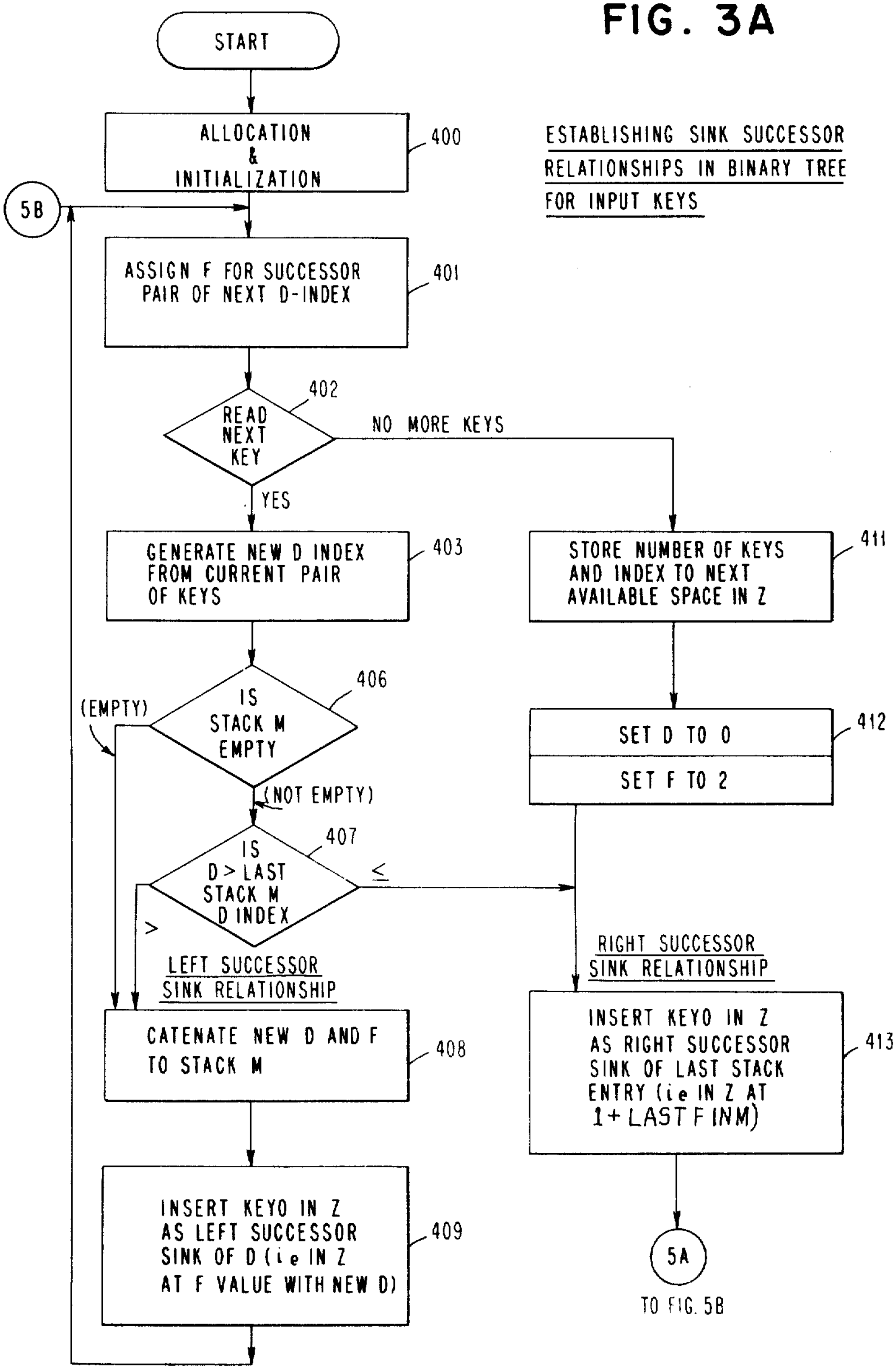
FIGS. 3A and 3B show a general flow diagram for constructing the unique directory which is searched by the subject invention.

FIGS. 3A and B illustrate a flow diagram which describes a basic method for constructing a directory according to the subject invention. For a more detailed discussion of directory construction, the reader is referred to the related specification Ser. Nos. 136,951 or 136,902. The operation of FIGS. 3A and B is explained in terms of the example of directory construction shown in TABLE A, which generates the Z-index type of edge representation, which may be called "absolute" edges. Switch settings 430*a* and 431*a* are provided to skip steps 431 and 432 respectively in the method in order to generate the Z-index type of edge disclosed in related specification Ser. No. 136,902 regarding its FIG. 5B.

Figure 3B:
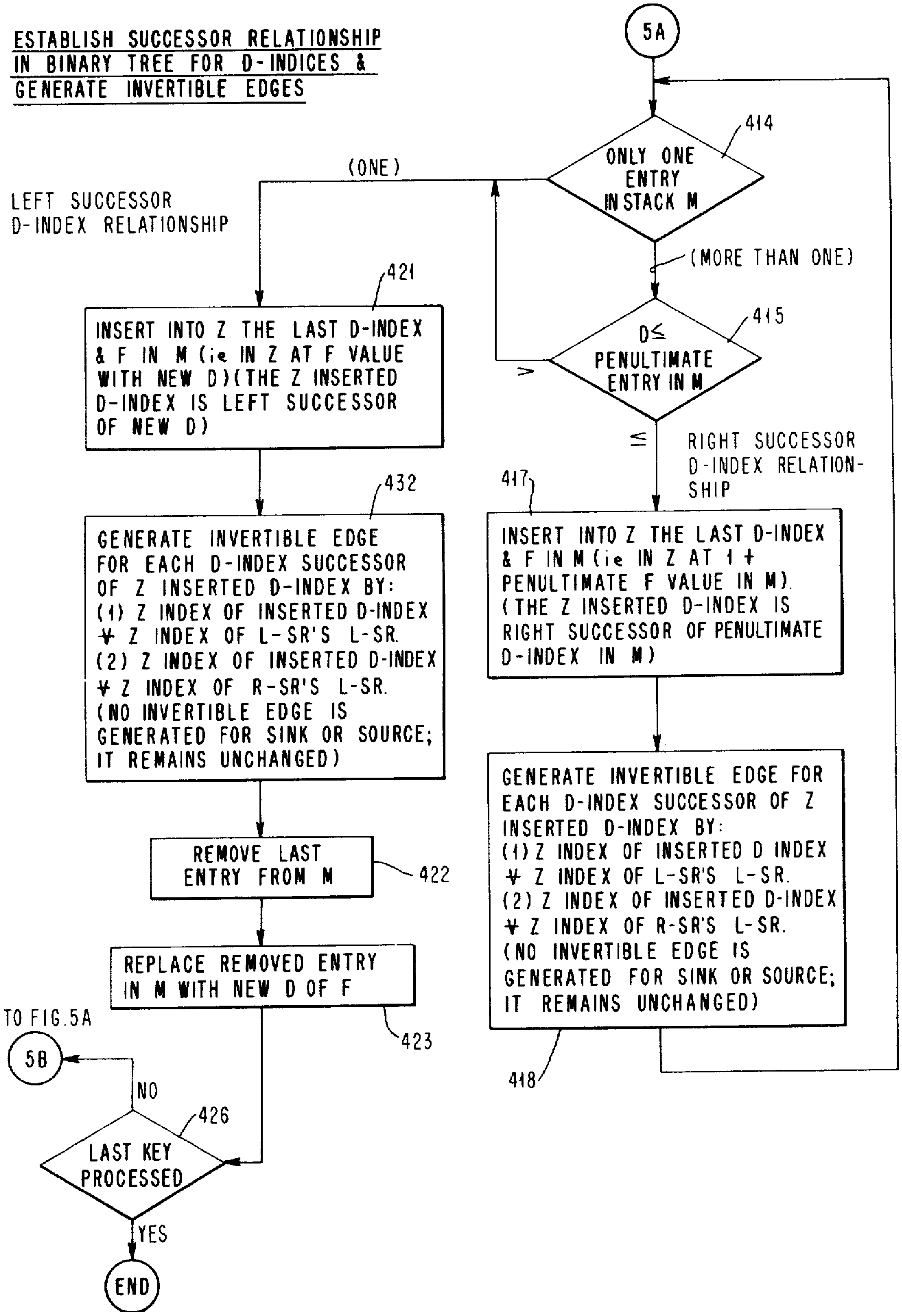

In FIG. 3B, the other switch setting 430b and 431b include steps 431 and 432 in the method in order to generate the "invertible" edge representations in the manner disclosed in related specification Ser. No. 136,902 regarding its FIG. 5C. TABLE-A shows the stack collection of right-legs of subtress in the binary tree as the directory is being constructed, as follows:

TABLE A

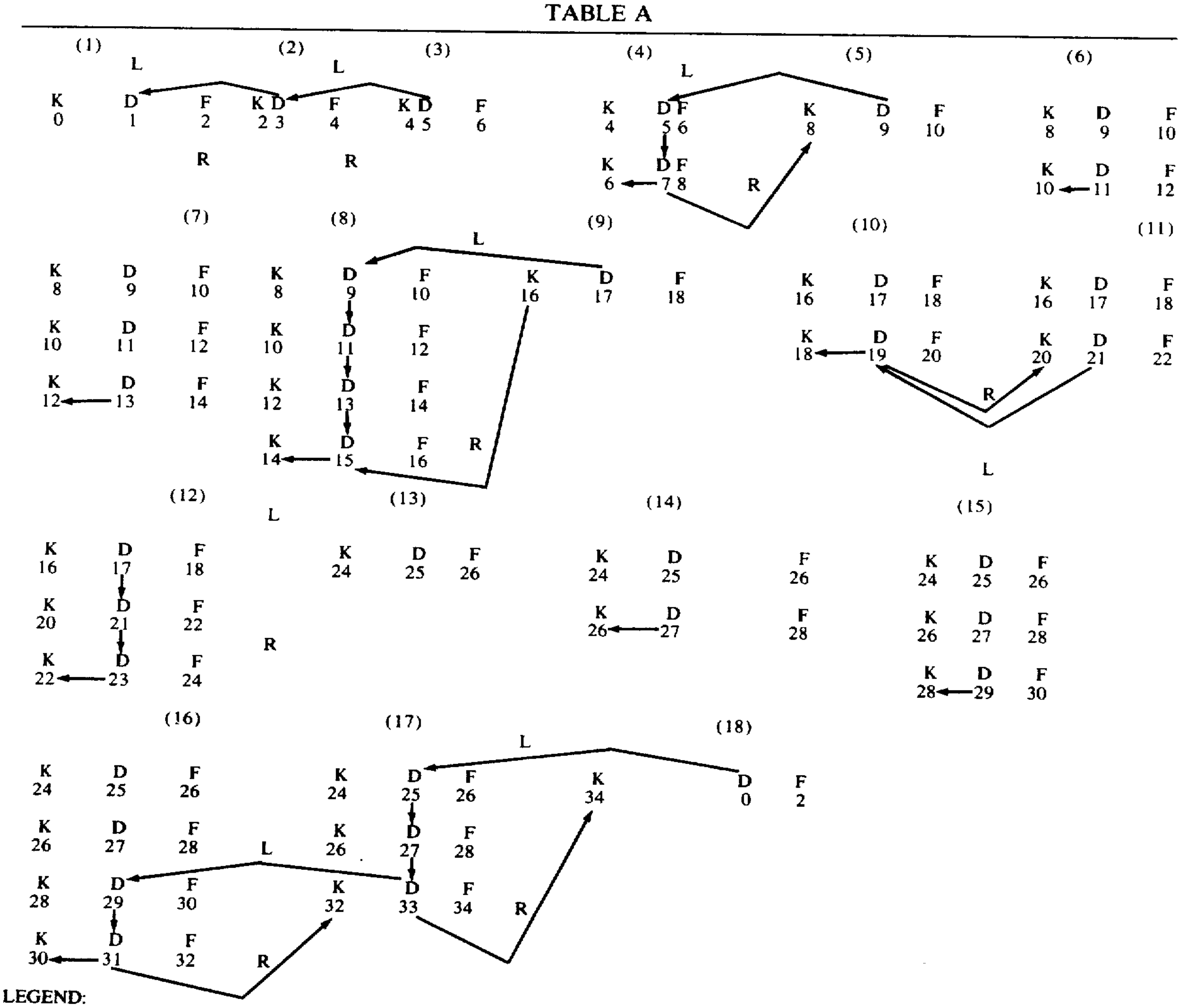

LEGEND:
Each arrow points to successor from predecessor in binary tree.
Straight downward arrow points to right successor.
Straight leftward arrow points to left successor.
R label on curved arrow identifies right successor.
L label on curved arrow identifies left successor.

In FIG. 3A the method is started by entering step 400 which allocates the required space, if it has not already been provided, for the matrices, registers, and fields required (such as for an intermediate matrix M, the directory matrix Z, a field F and a field K). Also they are initialized to a state in which the method can be started, such as by setting F to the predetermined row index in matrix Z which reserves space for the source entry, and by setting to 0 the row index for matrix M, in which it will receive the first D and F entry values. Matrix M is a push-down stack operating on a last-in-first-out basis in which its row index value points to the last-in-entry. Initialization also includes beginning the reading of the first pair of keys, K0 and K2 of a sorted sequence of input keys, which are respectively identified as KEY0 and KEY1. An indication is provided when the end of the sequence of input keys is reached, such as by counting the input keys and signalling when the count for the last input key has been reached.

Then step 401 is entered to assign space in matrix Z for the successor pair to be determined for the next D-index, if any, which will be generated. This can be done by stepping field F (which is a counter whose content is the Z-index) by an increment equal to the row space required for the next successor pair, for example two rows. Thus if F was initially set to zero, step 401 will set F to 2, which is the row in matrix Z for the first successor pair.

Step 402 is then entered to sense whether there is a next key, i.e., whether the last key was read, and thereby indicates whenever there are no more input keys. However, if a next key is read, the "yes" exit is taken to step 403. Thus operation (1) for TABLE-A continues.

Step 403 is entered to generate the D-index from the next pair of keys, which is initially the first pair of K0 and K2. The D-index is generated as previously described by finding the highest-order unequal bit position in the pair of keys.

Then step 406 is entered which examines the number of entries in stack M, i.e., the current setting of the row index for M is 0. If matrix M is empty, which exists upon the generation of the first D-index, step 408 is entered to catenate the D-index to whatever is previously there, which initially is nothing. Thus step 408 places the new D-index into the first position in stack M, i.e., into row 0. Then step 409 inserts KEY0 into matrix Z in the most-recently assigned left-successor location, which is in the Z-row represented by the current value in field F. KEY0 always refers to the first key of the pair being compared to generate the new D-index, and KEY1 always refers to the second key of the pair which is the last inputted key. KEY0 is always associated with an entry in TABLE-A, because the sink relationship is always established with KEY0 which is presumed in the discussion of FIGS. 3A and B to have its representation inserted into matrix Z.

Operation (1) is completed when the method exits from step 409 and step 401 is reentered to begin operation (2).

Step 402 determines that a next key, K4, is inputted from the input stream which now becomes the second key, KEY1, of the current pair; and the prior key, K2, now becomes the first key, KEY0, of the current pair. Then step 403 is entered to generate the new D-index from the current pair in the manner previously explained.

Step 406 now finds stack M not empty. Thus step 407 is entered and finds that the new D-index, D3, is equal or less than the last D-index, D1, in stack M, so that an exit is taken to step 413 which inserts KEY0, i.e., K2, into matrix Z at the location assigned to the right successor of the last stack entry, D1. That is, K2 is placed in Z row 3 which is one plus the last F, i.e., F2, in M. An exit is then taken to step 414 in FIG. 5B.

Step 414 determines that there is only one entry in stack M at this time during operation (2) because only the entry shown in TABLE-A at (1) exists at this time. As a result, step 421 is entered to insert into matrix Z the last entry in stack M, i.e., the entry inserted in operation (1). This entry is inserted into matrix Z at the location assigned to the left successor of the new D-index, D3, which is F4. Thus D1 and F2 are inserted into row 4 in matrix Z. Then step 422 removes the entry from stack M, and step 423 replaces it by inserting the new D-index, D3, and F4 into stack M to overlay the removed entry and thereby replace it. The removal and replacement steps have been explained in a manner which is believed to best understand the logic of what is happening. In practice the logic of steps 422 and 523 is preferably done in a computing machine in the single step of overlaying the last entry in matrix M with the new D and F-values.

Step 426 is then entered to determine if D3 is the last key processed, which would have been previously indicated as a result of step 402 operation. Since k4 is not the last key, the no exit is taken back to step 401 in FIG. 3A to begin operation (3) in TABLE-A. Accordingly, step 401 assigns space in matrix Z to the successor pair for the next D-index to be generated by incrementing the F-value to F6. Then step 402 determines that a next key k6 is inputted, and step 403 compares k6 with the last key k4 to generate the new D-index, D5. Operation (3) continues using the same steps as described for operation (2) and it is completed with the insertion of K4 in Z-row F5, and D3 F4 in Z-row F6, the removal from stack M of D3 F4, and its replacement with D5 F6. Step 401 is again reentered to begin operation (4).

Step 401 at this time increments the F-value to F8, step 402 determines that k8 is inputted as the new KEY1, and step 403 generates the new D-index, D7.

Then step 406 is entered and it finds that stack M is not empty. Step 407 is now entered to compare the new D-index to the last D-index in stack M, which is D5 at this time in operation (4). The new D-index is found to be greater than the last D-index. Hence step 408 is entered and the new D-index, D7 with new F-value, F8, catenated to the last D-index in stack M, so that the new D-index now becomes the last D-index in stack M. Step 409 inserts KEYO, K6, into matrix Z at row F8; and operation (4) is completed.

Operation (5) begins when step 402 is again entered. Since step 402 determines K8 is the next key, entered to generate the new D-index, D9, from the current pair of keys, K6 and K8. Step 406 finds the stack is not empty, and step 407 determines that the new D-index, D9, is equal or less than the last D-index, D7, in stack M. Therefore step 413 is entered which causes KEYO, i.e., K8, to be inserted into matrix Z at row 9, i.e., 1 + F8 (the F-value with the last stack entry). An exit is then taken to step 414 on FIG. 3B to begin the removal process. At this time, step 414 determines that there is more than one entry in stack M, and step 415 is entered. Step 415 compares the new D-index, D9, to the next-to-last D-index, D5, and determines that the new D-index is equal or smaller to the next-to-last entry, D5, i.e., a sequence break is found. As a result, the yes exit is taken to step 417 which causes the insertion into matrix Z of the last entry, D7 F8, in stack M as the right-successor of the next to last D-index, D5, in matrix M. That is, the entry, D7 F8, is inserted into matrix Z at row F7, which is 1 + F6. Then step 418 is entered which removes the last entry in stack M, i.e., D7 F8; and now D5 F6 is the last entry in matrix M. Then step 414 is re-entered which now determines that only one entry exists in stack m, so that the exit is taken to the replacement sequence which begins at step 421. Thus steps 421 through 426 operate as previously described to obtain the insertion into matrix Z of the current last entry, D5 F7, into Z row F10 as the left successor of the new D-index, D9. Then the last entry, D5 F6, is removed and replaced by the new entry D9 F10, which now is the only entry in matrix M at the completion of operation (5).

Operations (6), and (7) and (8) are catenation operations which use steps 408 and 409 for each entry catenated into matrix M as previously described for operation (4).

Operation (9) is similar to the operation (5) which was previously described to use the steps shown in FIG. 5B, which involves removing all entries in matrix M and replacing the earliest entry, D17 F18, which is the only remaining entry upon the completion of step (9).

Operation (10) involves a catentation step in the same manner as described for operation (4).

However operation (11) involves a slight departure from the sequence of steps previously described. New D-index D21 is generated during operation (11) from K20 and K22 as KEY0 and KEY1 respectively. The Z-row index F22 is assigned as the space for the successor pair of D21. Step 407 during operation (11) determines that the new D-index, D21, is less than the last D-index, D10, in matrix M. Accordingly step 413 is entered to insert K20 into Z-row F21, i.e., 1 + F20. Then an exit is taken to step 414 in FIG. 3B which finds that there is more than one entry in stack M, and step 415 is entered. Step 415 determines that the new D-index, D21, is greater than the next-to-last D-index, D17, currently in stack M; and the "no" exit is taken to step 421. Steps 421 through 426 cause the last stack entry, D19 F20 to be inserted into matrix Z at row F22, which is the F-value with the new D-index, D21; and the new entry D21 F22 replaced last entry D19 F20. Then operation (11) is completed.

The following operations (12) through (16) are catenations and entire replacement of entries in stack M with a new entry in the manner previously described.

Operation (17) has a slight difference from the prior described sequence of steps, and it is most similar to operation (11) just described. This difference in sequence occurs when step 415 is first entered; its "yes" exit is taken so that the last stack entry, D31 F32, is inserted into matrix Z at its row F31, i.e., 1 + F30, and this entry is removed from matrix M, so that D29 F30 is now the last stack entry. Then step 414 is reentered which again takes its more-than-one exit to step 415. But now step 415 takes its "no" exit to step 421, since it finds that the new D-index, D33, is greater than the current next-to-last D-index, D27, in stack M. Therefore the current last entry D29 F30, is replaced in stack M by the new entry D33 F34 to complete operation (17). Then step 401 is reentered.

Operation (18) is the last operation in the directory construction for FIG. 1D, and therefore it causes some of the steps to act in a special way.

Step 401 positions F to the available space, F36, at the end of matrix Z. Then step 402 takes its "no more keys" exit when it finds that there is no key following k34, such as by exhaustion of an input key count. Step 411 is entered to store the number of keys which were inputted, i.e., input key count, and the current Z index F36 to the next available row in matrix Z, which will not be used at this time. Then step 412 sets C to zero and F to 2, which represents the location into which the source entry is to be placed in matrix Z. Then step 413 is entered which causes the last inputted key, k34, to be inserted into matrix Z as the right successor of the last D-index, D33, in stack M; and this sink entry is placed into matrix Z at row F35, i.e., 1 + F34, the latter being the last F-value in matrix M. Then step 414 is entered in FIG. 3B wherein an operation occurs in the manner previously described for operation (5) involving removal of all entries in matrix M and the replacement of the earliest item with the new entry, D0 F2, which then is the only remaining entry in M to complete operation (18). The directory construction is now completed in the manner shown in FIG. 1D.

When a change is made in the switch setting to 430b and 431*b*, the edges will not have the form shown in FIG. 1D. i.e., F-values, but the edges will instead be the Exclusive-OR values derived with steps 431 and 432.

SEARCH ARGUMENT

Any key originally represented in the construction of a directory, such as K0 . . . K34 in FIG. 1C, can be used as a search argument for searching the directory, such as shown in FIG. 1D, and its data record will be found. Any key not represented in the directory can be used as a search argument, but it will not be found in the directory.

The search argument, like a key, comprises a sequence of bits from high-to-low order, i.e., from its left-most bit through its right-most bit in ordinary machine representation.

A basic concept found in the subject invention is found in having each search argument define a unique "path" through a directory from its source to the sink representing the search argument, if there is one. The sequence of bits in the search argument determines the unique path. This sequence of bits is in the order found in the search argument, but the sequence often skips some of the bits in the search argument. This unique set of path-defining bits is called a "path vector, " since it defines a path through a directed binary tree represented in a directory.

TRACE VECTORS AND PATH VECTORS

In FIG. 1A, the vertices visited during a path traverse from source to sink may be recorded in the order they are visited to form an ordered list, or vector, of vertices. The vector of vertices visited during a traversal is called a "trace vector" if it contains the labels of the vertices visited in the order that the vertices are visited. For example in FIG. 1A, the trace vector D25, D17, D9, D11, D13, D15, K14 represents the vertices along the traversed path from source D25 to sink K14.

A "path vector" represents the selection between left and right edges when leaving each inner vertex while traversing a path from source to sink. The selection at each inner vertex can be concisely represented by a single bit, in which the left-going edge selection is represented by the 0 value, and the right-going edge selection is represented by its 1 value. Hence the direction taken when leaving any inner vertex may be defined by the 0 or 1 state of a bit associated with that vertex. The invention provides this association between a vertex in a binary tree and a bit in a path vector, which is found in the search argument. The 0 or 1 state of the left-most bit in the path vector represents the edge selection from the source vertex, the next bit state represents the edge selected at the next encountered vertex in the binary tree, etc. Thus the path vector contains the edge selections at all vertices encountered during the tranverse of a path, in the order that the vertices are encountered. Consequently, the path vector concept eliminates the need for the edges in the graph to have unique labels in the binary tree which would require an unduely large number of bits dependent on the total number of vertices in the binary tree. The invention uses the the path vector concept which requires only a single bit per vertex in the path, wherein the state of each bit indicates which direction to take to get to the next vertex (successor vertex) in the path. The order of the bits in the path vector thus selects and associates each of its bits with a particular vertex when going from vertex to vertex along the path defined by the path vector. Essentially the path vector specifies which way to turn when leaving each vertex. Accordingly the path vector is localized in the sense that it is necessary to be at a vertex in order for each path vector bit to be usable. This implies that the path vector is quite useful for traversing vertices, even though it does not directly record which vertices are visited, as does the trace vector.

Consequently path vectors can be represented very compactly, due to its single bit per vertex characteristic. Accordingly in the graph in FIG. 1A, each vertex represented in a path vector requires only one bit for its representation. For example, the path vector representation from source D25 to sink K14 is 001110, which takes 6 bits. The trace vector is less efficient since it contains more bits to represent a path; for example, the trace vector for the same path in the same graph may be represented as 25170911131514 (the D labels visited) which takes 7 bytes (using packed decimal in an IBM S/360 machine it totals 56 bits). The path vector representation is therefore only 10.7 percent of the trace vector representation.

PATH VECTOR RELATIONSHIP TO SEARCH ARGUMENT

Utilizing these concepts the novel search method found in this invention was developed for computer usage. The search method, when given a search argument in binary form, i.e., bits with a one or zero value, generates a path vector by selecting certain bits in the search argument and by determining the association of these bits to particular vertices in the graph represented in bit form in a directory. The sink found at the end of the path is the result of the search. Different search arguments represented in the graph result in different paths being traversed. But different search arguments not represented in the graph may not necessarily result in different paths being traversed.

The directory, such as shown in FIGS. 1D, 4B, or 6, contains binary representations of the vertices of a binary tree. Each row in the directory, except the first row, contains a bit vector which represents either an inner vertex or a sink. The D-index field within each inner vertex row associates that vertex with a particular path-vector bit position in a search arrgument, so that the path vector is being generated from the search argument at the same time that the bits in the path vector are being used to trace a path. During machine execution, there is no need to store the path vector because it is being used to trace the path at the same time that it is being generated from a search argument.

The generation of a path vector can be expressed in more detail by the following method for searching a binary tree represented in a directory:

Step 0:

In the directory, read the D-index of the currently selected vertex. (Initially the source is the currently selected vertex.)

Step 1:

In the search argument, select a bit at the bit position represented by the value of the D-index. (The selected bit is a bit of the path vector.)

Step 2:

Test the value of the select bit for 0 or 1. If 0, the edge to the left successor is obtained; but if 1, the edge to the right successor is obtained to select the successor (next) vertex in the path.

Step 3:

Test the flag field in the current vertex to determine if the selected successor is a sink or inner vertex. If it is a sink, it is obtained and the directory search is ended. If the selected successor is an inner vertex, continue the search by obtaining the selected successor, which now becomes the current vertex; and go to step 0.

In this manner each next bit in the path vector is determined from the search argument each time the method reiterates through step 1 above, and the path vector is completed when step 3 finds the successor is a sink.

EDGE AND FLAG FIELD CONTROL DURING SEARCHING efficient representation of the information is preferred for the machine execution of the method. A single edge field is used to represent both the left and right edges of a inner vertex due to the use of the "successor-pair" concept which always puts the left and right successors respectively in a pair of contiguous rows in the directory. The edge field per se is the edge to the left successor; and the edge to the right successor in the next row in the directory is derived by adding one to the index of the left successor; hence the one edge field represents both left and right edges. However the location of the successor-pair is seldom next to its predecessor vertex in the binary tree, and the edge representation within the predecessor row considers this distance variation, which can be random.

Different ways may be developed to represent whether or not each vertex is inner or sink. The flag field with each inner vertex represents for its two successor vertices whether each is a sink or inner vertex. The flag field therefore does not represent the sink or inner vertex condition for the vertex containing the flag field, but it only represents the sink or inner vertex state for each successor (next) vertex which may be traversed along a path in the binary tree. This predecessor flag technique avoids the necessity of having any indicator with a sink to signify that it is a sink. Also it enables the method to stop at the predecessor of the sink, which may be desired in some situations. Hence the inner vertices have all the flag information needed for the method; and by this architecture of the successor inddicating flag fields, each sink representation can use an entire row in a matrix. In practice it has sometimes been found that sink representations require more bits than do inner vertex representations in the directory. The flag bits could instead be represented within the successor vertices rather than within the predecessor vertices as has been done in the detailed embodiments herein. In the former case, all sinks and all inner vertices except the source would have a two bit flag field. The same total number of flag bits occurs in the directory in either case.

CONTENT OF A SINK ROW

A sink content associates any required digital information with the sink and it may be an address of a record being represented by the sink. The record may be stored in main memory or on an I/O device. Thus the sink content may encompass a range of types of addresses in some directories.

SEARCHING A DIRECTORY WITH OFFSET EDGES -SPCH1

FIG. 4A illustrates a search method called SRCH1. It is used to search the directory 40*a* stored in memory 40 shown on FIG. 1B. Directory 40*a* is shown in more detail in FIG. 4B in which it comprises a directed binary tree as previously described in which each inner vertex is represented by a row vector of bits, each inner vertex having a row representation containing a D-index, and edge field of the offset type and a flag field of bits $t_0c_0t_1c_1$. The offset edge field with each inner vertex represents the number of rows between the vertex and its successor pair, and includes a sign bit indicating whether the successor is above or below the vertex in the directory. The offset type of edge is easily generated for each inner vertex by subtracting the Z-index of its row from the Z-index of the successor pair within the row.

A search argument (S.A.) 40*c* is also contained in a field within memory 40 which is identified by the address in a predetermined field 40*e*. Other fields in memory 40 contain the initialization needed for executing the method SRCH1, such as a predetermined field 40*d* which contains the address of the source row in directory 40*a*.

The execution of method SRCH1 on a computer system, such as an IBM S/360 Data Processing System, is speeded by making use of the general purpose registers provided therein rather than fields in main memory. FIG. 4C illustrates particular ones of such general purpose registers which may be used to speed up the execution of the method in FIG. 4A when it is implemented as a macro-program.

If the method in FIG. 4A is implemented as a microprogram, or entirely with AND, OR, INVERT circuits, the registers 41 may be found in the local store, or local registers, of the data path of the computer's central processing unit (CPU).

The registers 41 are labeled to represent their respective contents. Thus register S.A. contains the address of the search argument; register ξ CELL contains the address of the row representing the current vertex in the directory being processed; and register CELL receives the content of the directory row being addressed by the content of register ξ CELL.

The sequence of steps and their operation in embodiment SRCH1 is as follows:

Step 20:

The search method is entered either by directly starting the method, or as a branch from some other method which requires SRCH1 as a sub-method.

Step 25:

The content of field 40*d* is transferred into register ξCELL as part of the initialization prior to beginning a search of the directory.

Step 30:

The address of the search argument in predetermined field 40*e* is transferred into register ξ S.A. There may be a sequence of search arguments which are to be searched for in the directory, and this may be the address of the first in the sequence.

Step 35:

The register CELL is loaded with the row in the memory addressed by the content of the register ξCELL. Initially register ξ CELL contains the address of the source vertex of the directory 40*a*. Hence the source vertex row is initially loaded into register CELL. (Later during the method, at steps 60 and/or 65 during the current iteration of SRCH1, register ξ CELL is updated to contain the address of the next vertex row in the directory required by the path vector in the current search argument).

Step 40:

This step determines a path-vector bit. It is the search argument bit (S.A. bit) at the position in the search argument represented by the value of the D-index field in the register CELL. The D-index field is in predetermined bit positions, such as bit positions 0 – 10 in register CELL. The D-index value identifies the bit position in the search argument as measured from its highest-order bit position, i.e., left-most bit position. Hence 11 bits in the D-index can identify a bit position from 0 to 255 in the search argument. The bit at this position in the search argument is the selected S.A. bit, and the selected path vector bit. It is thereby accessed at this position from the highest-order bit in main memory field 40*c*.

Step 45:

This step tests the S.A. bit (i.e., path vector bit) accessed by step 40 to determine if it is a 0 or 1. The 0 or 1 state of this bit controls the selection of the successor vertex and thereby governs the current part of the path being traversed in the binary tree. If the S.A. bit is 0, the left successor vertex is next selected; but if the S.A. bits is 1, the right successor vertex is next selected. (The S.A. bit need not be moved, in theory, since it can be tested to see if it is a 0 or 1 in the accessed memory bit position. The architecture of the particular computer system will determine whether it is essential to move the bit in order to test it).

Steps 50 and 55:

The flag bit field $t_0c_0$ or $t_1c_1$ in register CELL is tested to determine if the required successor vertex is a sink or inner vertex. If the S.A. bit tested by step 45 is 0, step 50 is entered, which tests the flag bits $t_0c_0$ to determine if the left successor is a sink or inner vertex. If $t_0$ is 1, the left successor is an inner vertex; but if $t_0$ is 0 the left successor is a sink. On the other hand, if the right successor is selected, the flag bit $t_1$ is tested for 1 or 0 to determine if the right successor is an inner vertex or sink, respectively. The bit $c_0$ or $c_1$ is tested to determine if the selected successor is in main memory. That is, it may be in another I/O record which has not been read into main memory, and the state of $C_0$ or $c_1$ then indicates that it needs to be read into main memory. The state of the selected flag bits $t_0$ $c_0$ or $t_1c_1$ is set into the condition code, CC, of a computer system such as an IBM S/360, and then they can be interpreted by branch instructions.

Step 60:

This step adjusts the row value in register CELL the right succesor will be accessed. As previously explained, the right successor vertex is in the row immediately following the related left successor row in the directory. Hence, by adding one row length to the current row before applying the offset, the offset will then access one row down, i.e., the right successor. Then step 65 can be entered to determine the address of the right successor vertex.

Step 65:

Step 65 generates the address for the required successor by adding the value of the offset field currently in register CELL to the address of the current vertex within register ξCELL. The result of the addition operation is loaded into register ξCELL at the end of the execution of step 65, so that it is updated to contain the address of the successor (next) vertex to be accessed during the search. Step 65 generates the address of the left successor when it is entered from step 50; but step 65 generates the address of the right successor if it is entered from step 60.

Steps 70, 75 and 80:

The content of the condition code, CC, in the CPU hardeard receives the selected flag bits tc and is tested to determine if both bits are ones. If *c* is 1, the required vertex is in memory; and it is an inner vertex if *t* is 1, in which case a branch is taken back to step 35 to access the next vertex. Thus when CC is 1 1, step 35 is entered to continue the method by loading register CELL with the successor vertex and repeating the steps until the search is completed. However, if either the *t* bit or *c* bit is a zero, the method is to be ended after entering step 75 to store the result, and then entering final step 80. If *c* is 1 and *t* is 0, the required successor is a sink in memory 40, and the method ends with the address of the required sink in register ξCELL. If the tested C bit is zero, the required successor is not in memory 40, and hence it must be fetched into memory 40 using the address in ξCELL before it can be processed. According an exit is taken to step 75 which loads search result (S.R.) field **40*b*** with the sink at the current address in register ξCELL. Then step 80 is entered to end the operation or return to a calling routine which will use the sink.

SEARCHING A DIRECTORY WITH INVERTIBLE EDGES—SRCH2

FIG. 5 illustrates a method which searches a directory having invertible edges; and this method is called SRCH2. The method shown in FIG. 5 is fundamentally similar to the method described with FIG. 4A.

FIG. 6 illustrates a directory **40*a* which has edges which may have the invertible form which can be searched by SRCH2. The invertible edges may be generated as previously described herein or in specification Ser. No. 136,902. FIG. 6 also shows a plurality of fields or registers which are used in the processing of the method in FIG. 5**.

The search of a directory containing invertible edges requires the retention of the memory address of each predecessor of the current vertex encountered during the search. The address of the successor in memory 40 is determined by Exclusive-ORing together the invertible edge found in the current vertex row and the directory index derived for accessing its predecessor. Fundamentally, the method in FIG. 5 uses this exclusive-ORing technique superimposed upon the method in FIG. 4A to generate the directory index for each successor required in the search Path.

FIG. 6 shows the fields or registers which are used in the method of FIG. 5 which are: Register P which is loaded with the Z-index of the predecessor of the current vertex, Register C which is loaded with the Z-index of the current vertex being examined by the method, register S which is loaded with the Z-index of the successor pair of the current vertex, Register BASE which contains the address of matrix z containing the directory in main memory 40, register CELL which contains the content of the current vertex as represented by a row in matrix Z, register ACELL which contains the address of the row in matrix Z which is loaded into register CELL, register ξS.A. which contains the address of the search argument, i.e., the address of the highest-order bit in the search argument.

The method SRCH2 is entered at step 21. At step 25 register P is initialized to zero to represent the fact that the source (which is the first vertex to be accessed) has no predecessor in the directory; and register C is loaded with 1, which is the Z-index of the source vertex row in matrix Z which contains the directory in main memory 40.

Then step 31 examines the initial field in matrix Z which contains the number of rows used in matrix Z, which is divided by two to determine the number of sinks in matrix Z. Step 31 tests this derived number of sinks to see it it is greater than 1. If there are two or more sinks in the directory, the search can proceed by going to step 35. If there is one or no entries in the directory, an exit is taken to step 32 which determines if there is one entry, in which case step 36 sets the condition code to 00 in the computer system (i.e., an IBM S/360), and the process is ended. However if step 32 determines that there are no sinks in the directory, step 33 sets the condition code to 11, and the process is ended.

Ordinarily step 31 will find that there is more than one entry in the directory, since normally the directory will be very large in order to support a very large data base. In this case, an exit is taken to step 35.

Step 35 accesses the row in the directory at the Z-index in register C (which initially is the source vertex row), and this row is loaded into register CELL.

Step 39 then generates the Z-index for the successor pair from the edge field in the current vertex, and stores the Z-index of the successor pair in register S. The successor pair Z-index is generated by Exclusive-ORing the content of the edge field in register CELL and the Z-index of the predecessor which is currently in register P. Then step 43 selects a search argument bit (S.A. bit) which becomes the currently selected path-vector bit. This path vector bit is the bit in the search argument having the position (from its high-order end) represented by the D-index in the currently accessed vertex.

Step 45 then tests this S.A. bit for a zero or one state. If zero, the left successor of the current vertex is the next vertex to be traversed along the path being traced. On the other hand if the S.A. bit is one, the right successor is chosen as the next vertex.

Step 50 is entered if the left successor is to be chosen and the left successor flag bits $t_0$, $c_0$ currently in register CELL is set into the condition code, CC. If instead the right successor is chosen by step 45 then step 55 is entered which sets the right successor flag bits $t_1$, $c_1$, into the condition code, CC.

Upon exiting from step 50 for a left successor choice, no adjustment is needed to the successor pair address in register S generated by step 39, since the successor pair index is inherently the Z-index of the left successor of the pair.

However if the right successor is chosen by step 45, the Z-index of the right-successor must be adjusted within register S, which contains the Z-index to the left successor as the successor pair index derived in step 39. Accordingly step 60 increments the Z-index in register S by one in order to generate the Z-index to the right successor.

Next, steps 64 and 65 are executed in preparation for the next iteration of the method which looks for the next successor vertex. Steps 64 and 65 change the status of the successor and current vertices in the current iteration to the current and predecessor vertices respectively in the next iteration. Accordingly step 64 loads register P with the content of register C, which makes the current vertex a predecessor for the next operation. similarly step 65 loads register C with the content of register S for the next iteration of the method.

The next iteration will be entered only if the current vertex for the next iteration is an inner vertes. If it is a sink, the end of the search path is found and the directory search can end. To determine if the search should end, step 70 tests the flag bits selected during step 50 or 55 which are currently in the condition code, CC. If the conditioning code is 11, (i.e., $t = 1$ and $c = 1$), the current vertex for the next iteration is an inner vertex: as a result, an exit is taken back to step 35 which accesses the new current vertex now having its address in register C) and loads it into register CELL. The method reiterates through steps 35 – 70, once per path vector bit, until an iteration reaching step 70 finds that the last path vector bit has been reached, i.e., the condition code is not 11. In this case the "no" exit is taken from step 70 which recognizes that the search results are found in the current content in registers P and C. The process can then end, or return to a calling program. The sink is then obtainable from the Z-index in registers P and C by Exclusive-ORing their contents to generate the real sink vertex. The derived real sink can then be used for its intended purpose. Thus if the real sink is an address, it can be used to access the record containing the key which is the current search argument.

SEARCHING A DIRECTORY WITH ABSOLUTE EDGES—SRCH3

A method, herein called SRCH3, can search a directory having absolute edges as represented in FIG. 1D. SRCH3 is also disclosed in FIG. 5 after its step 39 is replaced by step 39*a* in FIG. 5A. Step 39*a* only transfers the edge field currently found in register CELL into register S, i.e., S⟶EDGE.

Register P and its operations found in steps 25 and 64 are not needed, but they do not interfere with the search of such directory, except perhaps to slightly slow down the search process.

The other steps shown in FIG. 5 are used by SRCH3 in the same way as described in the prior section entitled "Searching a Directory with Invertible Offsets."

HARDWARE MODE

Figure 7:
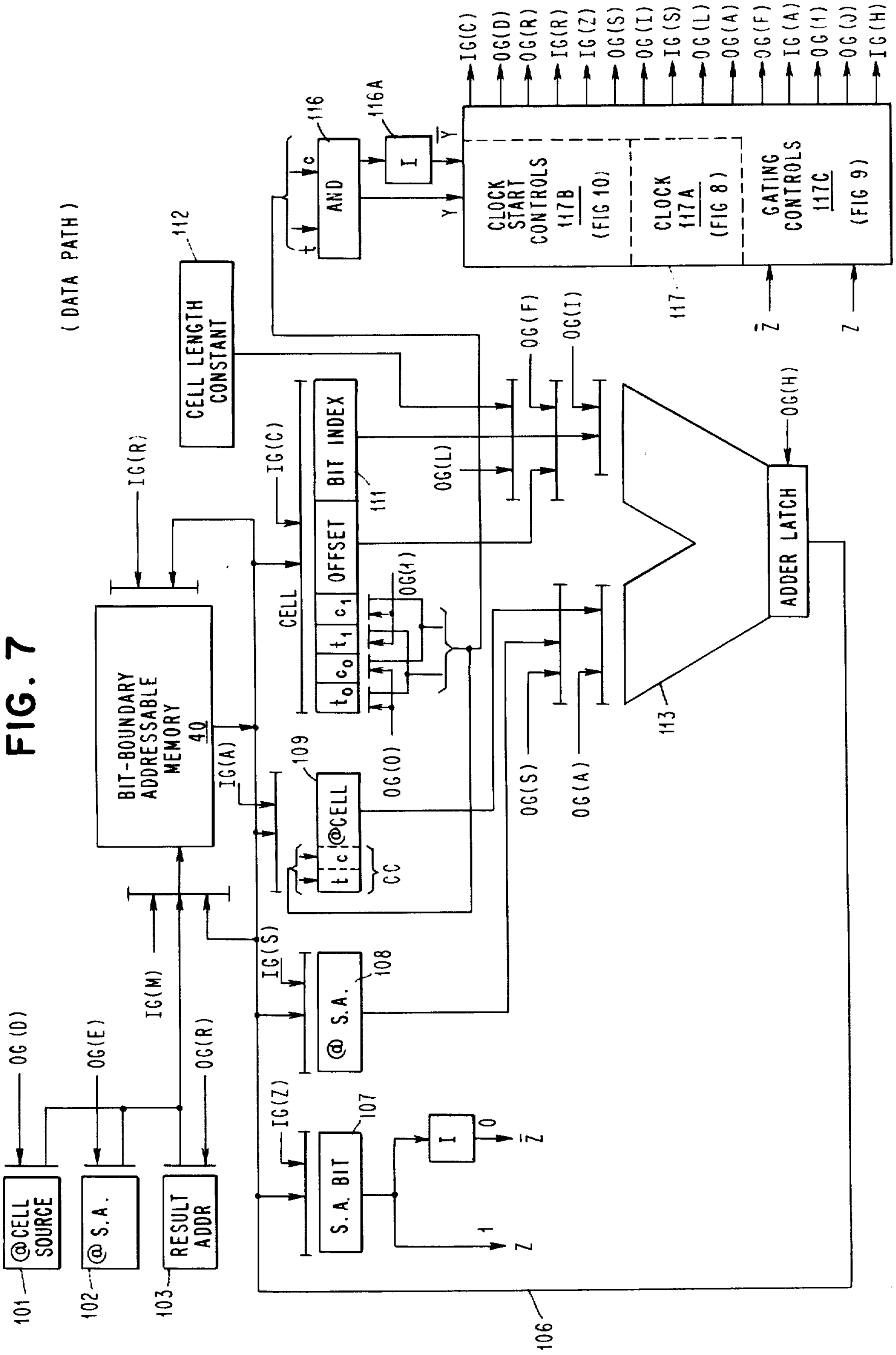
FIGS. 7, 8, 9 and 10 illustrate a hardware embodiment which executes the method shown in FIG. 4A.

FIGS. 7 through 10 illustrate a hardware embodiment which executes the steps in the method embodiment previously described with FIG. 4A, on which the clock cycles CO – C7 are superimposed. This hardware embodiment may be implemented in a computer CPU, channel, or control unit. FIG. 7 shows a data path connected to memory 40 via bus 106. The controls for generating the gating signals needed for transferring the signals for memory 40 and around the data path are generated with controls 117 in FIG. 7. Memory 40 in FIG. 7 is represented in more detail in FIG. 4B and contains the information there shown in the manner, and with the format, previously described.

The signals from controls 117 provide the ingating and the outgating signals for the registers in the data path in order to control its data transfers. The legend "IG" means ingate, and "OG" means outgate. Either IG or OG modifies a following letter or number in parenthesis which designates the particular register or field being operated upon. The following legend represents the meanings of the other symbols used in FIGS. 7–10:

| | |
|---|---|
| (A) | = Cell address register |
| (C) | = Directory row |
| (D) | = Emitter address constant for ξCELL |
| (E) | = Emitter address constant for ξS.A. |
| (F) | = Offset field |
| (H) | = Adder latch |
| (I) | = Bit index field |
| (L) | = Row length constant emitter |
| (M) | = Memory address bus |
| (R) | = Search result field in memory |
| (S) | = ξS.A. register |
| (Z) | = S.A. Bit (current) |
| (0) | = $t_0c_0$ field |
| (1) | = $t_1c_1$ field |
| C0 – C7 | = Clock positions |
| Y | = Process continuation signal |
| Z | = S.A. bit register output |

The transfers in the data path in FIG. 7 can be seen to perform the method shown in FIG. 4A, from the gate transfers represented in the following TABLE-B:

TABLE-B

| | |
|---|---|
| C0: | OG(D),IG(A),IG(M) |
| C1: | IG(S),OG(E),IG(M) |
| C2: | IG(C),OG(A),IG(M),IG(H) |
| C3: | OG(S),IG(Z),IG(I),IG(M),IG(H) |
| C4 & Z: | OG(L),OG(A),IG(H) |
| C5 & Z: | IG(A) |
| C5: | OG(A),OG(F) |
| C6: | IG(A), |

TABLE-B-continued

| | |
|---|---|
| C6 & Z: | OG(1), |
| C6 & Z: | OG(0), |
| C7: | OG(A),IG(H),IG(M),IG(R) |

Memory 40 is constructed so that it can fetch a row in the directory that begins at any bit position; and therefore it is addressable at any bit boundary by the address received through the gate actuated by control signal IG(M).

An entire row is always placed on bus 106 with the highest order bit being at the address provided by gate IG(M). Therefore memory 40 has bit alignable fields. A prior memory system that provides variable length data words which can begin at any memory bit address is described in U.S. Pat. No. 3,109,162 to W. Wolensky titled "Data Boundary Cross-over and/or Advance Data Access System" issued in 1963. All of the memory operating cycles within U.S. Pat. No. 3,109,162 are performed within any single clock cycle provided from the clock in FIG. 8.

Hence any entire row beginning at the addressed bit position can be provided from memory 40 to bus 106, which includes a number of parallel lines (not shown), each capable of simultaneously transferring a bit in the addressed row. In some cases only a single bit is desired from memory 40 such as the single bit in register 107 from the search argument (S.A.). Thus, the ingate for register 107 is only connected to line 0 of bus 106. The ingates for the other registers 108–111 may be connected to all lines in bus 106.

In memory 40, fields 40*b* - *40e* have locations that are always known. In FIG. 7, these locations for the respective fields 40*c* - *40e* are generated by the emitter circuits 102, 103, and 101 respectively. The gate signal OG(E) provides the address constant which locates the field containing the address of the address of the search argument (S.A.). Similarly signal OG(D) outgates emitter 101 which contains the address constant of the field which contains the address of the initial field needed in the processing. Also emitter 103 is outgated by OG(R) which contains the address of the field into which the search result will be provided at the completion of a search. Whenever any emitter circuit 101 - 103 is outgated, its output signal provides the address in memory 40 for addressing the highest-order (leftmost) bit position of a field. Any of these emitter signals is provided to a gate actuated by signal IG(M) from the gating controls 117C; this gate also receives other address signals from bus 106 needed for obtaining the next S.A. bit for register 107.

The output of the adder is the output of its adder latch. The adder latch has an ingating signal IG(H) which is provided to reset the contents of the adder latch. The adder latch output is always provided to bus 106 and will OR with any other input provided to bus 106. In order to prevent any false representations on bus 106 when the adder latch is not operational, an IG(H) signal is provided to reset it to zero while no adder ingate control signal is activated. Hence, the adder output cannot affect then any other signals on bus 106.

The writing within memory 40 is done by signal transfers controlled by signal IG(R). Writing is always done at the field addressed via the current signal being gated by IG(M). Accordingly memory 40 is cell addressable and writable at any bit address.

Register 108 initially receives the search argument address found in position 40*c* in memory 40 as shown in FIG. 4B. Register 109 initially receives the row address found in memory 40 at position 40*e*. In all operations, registers 108 and 109 contain the current addresses of the respective search argument and required row.

The registers 108 and 109 respectively have outgates connected to the left input of adder 113; they are actuated by signals OG(S) and OG(A), respectively.

Register 111 contains a format identical to the row format previously described for rows 40*a* in memory 40 shown in FIG. 4B. Register 111 receives the contents of the addressed row from memory 40 via its ingate connected to bus 106; the row is transferred from bus 106 through the ingate actuated by ingate signal IG(C).

Register 111 has a number of fields separately outgate controled by signals from gate controls 117C. Thus outgate signal OG(F) transfers the offset field of the row in register 111 to the right input of adder 113. The offset field is represented within register 111 in two's complement form; and when it is transferred, its sign bit (which is its leftmost bit) is propagated to the left at the adder input to fill all remaining bit positions to the left of the sign bit.

Similarly gate signal OG(I) transfers the bit index field from register 111 to the right side of adder 113. Any remaining bit positions in the adder input to the left of the bit index field are filled with zeros.

The $t_0 c_0$ or $t_1 c_1$ fields in register 111 are selected by one of signals OG(0) or OG(1) which transfer the selected to field from register 111 into register 109 at its leftmost two bit positions represented by *t* and *c*. These two positions are also designated CC for indicating that they represent the Condition Code as it is normally understood in reference to the IBM S/360 or S/370 computer systems.

The same tc field transferred by either OG(0) or OG(1) is simultaneously transferred to the inputs of an AND gate 116 which provides its output Y to the clock start controls 117B. The $\bar{Y}$ signal is provided via an inverter 116A.

An emitter circuit 112 provides a signal which is the row length constant, which represents the number of bits in any respective row in memory 40. The row length constant is provided as an input to the right side of the adder 113 whenever the signal OG(L) is provided by gating controls 117c.

Figure 8:
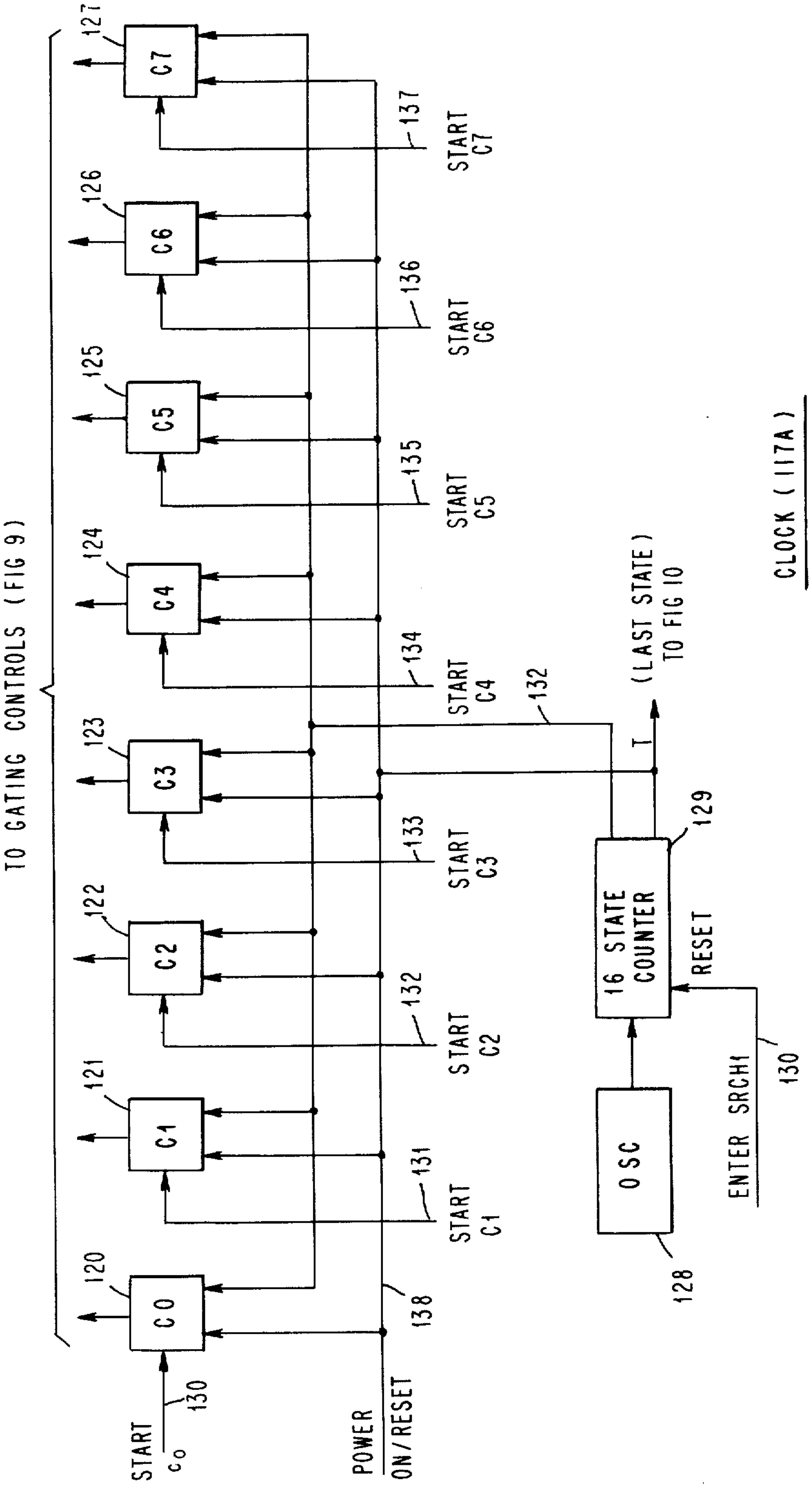

The clocking for the signals in FIG. 7 for controlling its performance according to the steps of the process shown in FIG. 4A is represented in FIG. 4A by the brackets identified by symbols C0 – C7. FIG. 8 illustrates a clock which can provide the clocking signals for timing this type of sequencing operation. The clock in FIG. 8 comprises a plurality of stages 120–127 which respectively provide the clock output signals during the time periods C0 – C7.

Initially all clock stages are reset by a signal on the power on/reset line 138. The clock stepping is synchronized by signals from an oscillator 128 which are divided down by a 16 (or other multiple) state counter 129 to provide an output signal when it switches from its last count back to its first count for its cycling under actuation of oscillator 128. These pulses provided at the output of counter 129 are sent on lines 132 to inputs of all circuits C0 – C7 to synchronize them.

Only one of circuits C0 – C7 receives a start input at any one time in order to control their sequencing. Initially stage 120 receives the start pulse which is provided from an external source which, for example, may be derived either manually or in response to the execution of an instruction which need not be further described, since instructions for generating actuating signals are old in the art. In addition counter 129 is reset to the beginning of its cycle by the start pulse on line 130.

Figure 10:
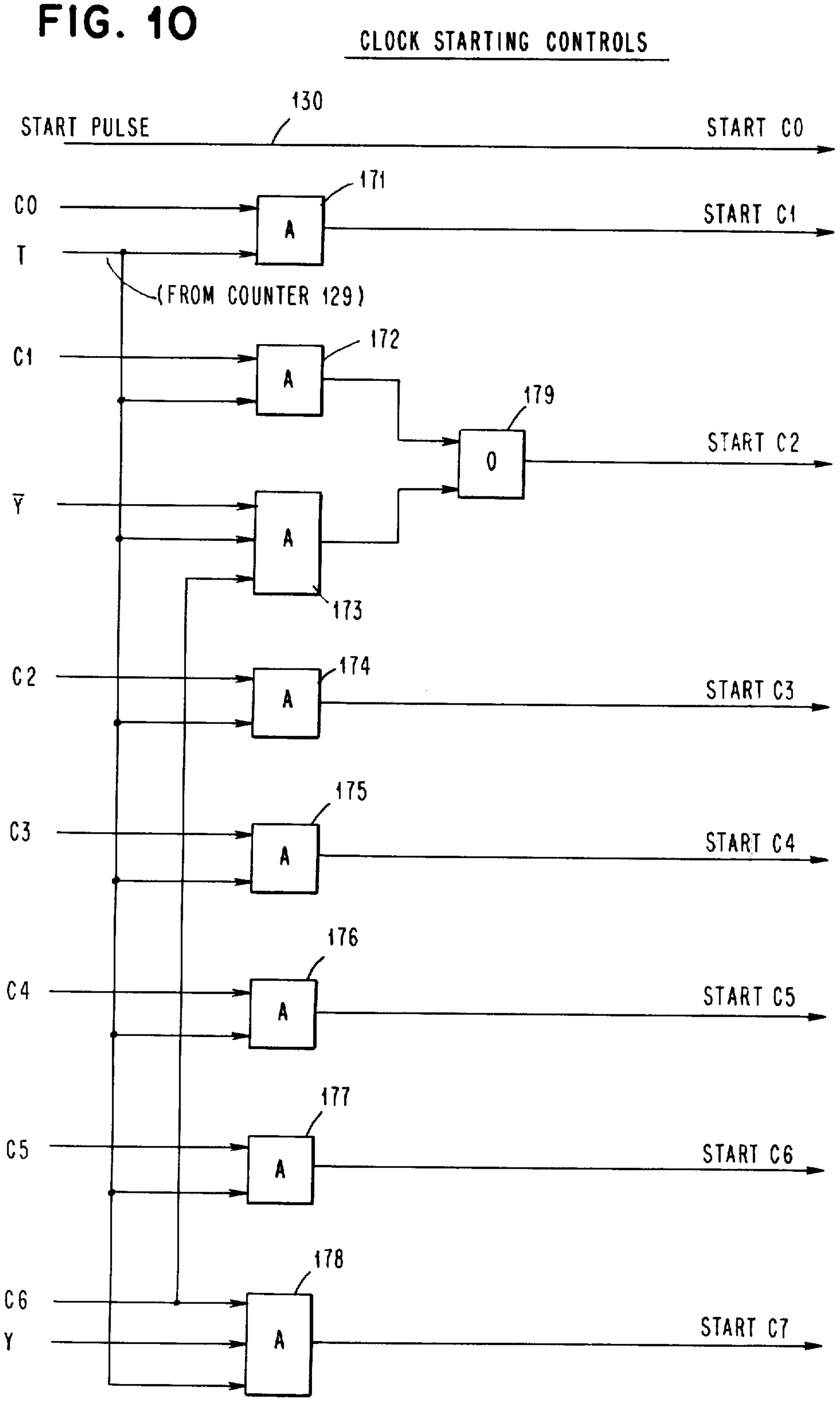

The start signals are generated by the clock starting controls in FIG. 10. In FIG. 10, a plurality of AND circuits 171 – 178 are provided in which each of the AND circuits 171 – 178 receives synchronizing pulse T from counter 129 and the clock output from another clock output. Thus at the end of cycle C0, AND gate 171 is actuated by signal T to provide the start C1 signal. Each of the other AND gates 172 – 178 is respectively actuated by one of clock outputs C1 – C6 and signal T. Therefore, whenever the T-pulse is received at the end of any clock cycle, the existing clock cycle is reset, and the next clock cycle is actuated by a respective AND gate output, so that the AND gate output starts the next clock cycle. An OR circuit 179 provides the start C2 pulse both at the end of the C1 cycle, and also at the end of the C6 cycle, so that the clock reiterates thereafter with cycles C2 – C6 until the search is completed for the current search argument. Hence cycles C0 and C1 are provided only once for each search argument. The Y and $\bar{Y}$ signals are provided from the output of AND circuit 116 in FIG. 7 to control the branching functions of the clock to cause it to initiate either cycle C2 or cycle C7.

Figure 9:
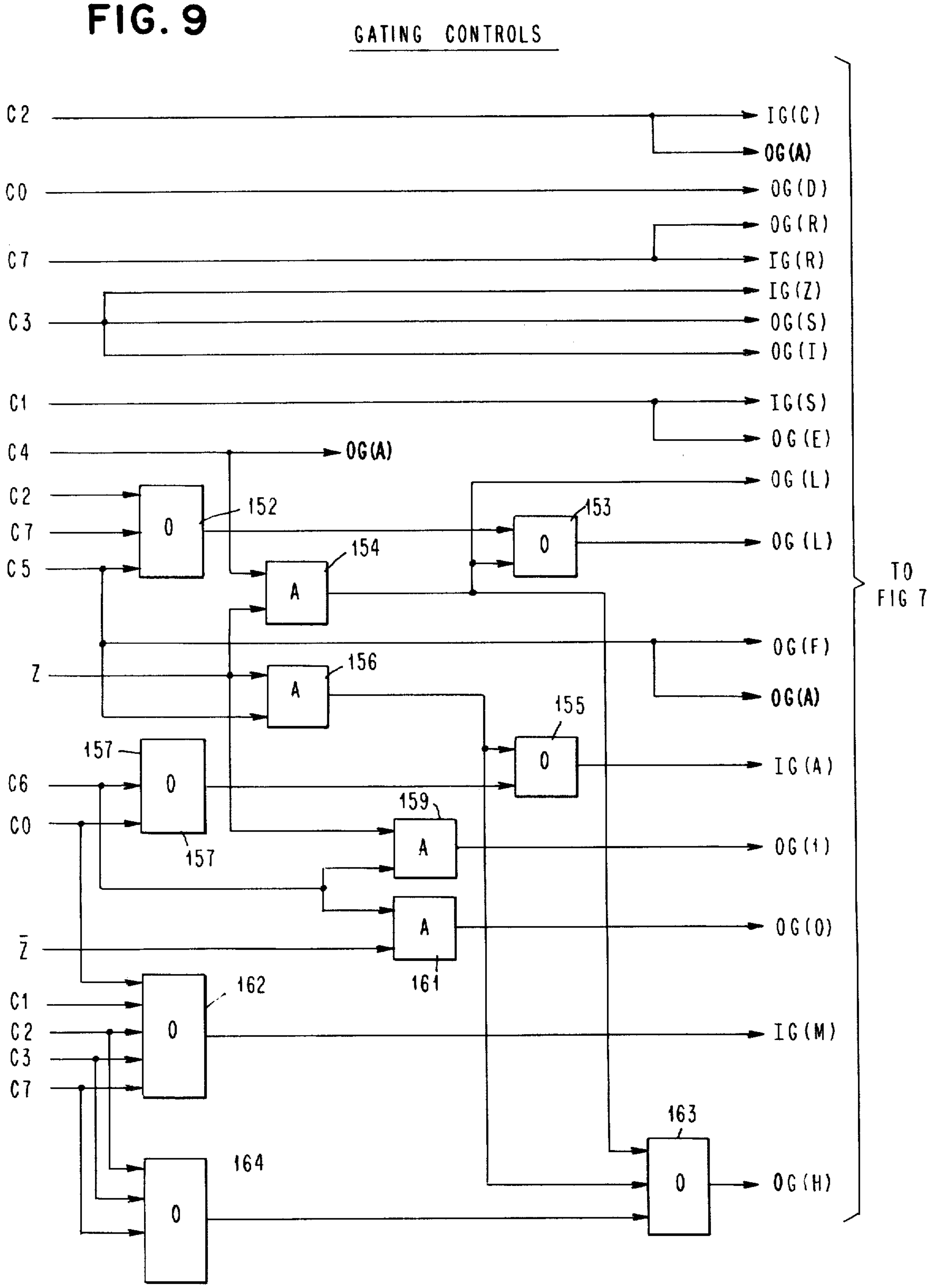

FIG. 9 shows the gating controls and includes a plurality of OR and AND circuits 151 – 164 to generate IG and OG signals. Also in FIG. 9 some of the gating signals are generated by a straight-through connection from its input. The inputs signals in FIG. 9 are derived from the output of the clock circuit in FIG. 8 and from signals Z and Z at the output of register 107 in FIG. 7.

Microprogramming may be alternatively used instead of the items shown in box 117 in FIG. 7 for generating the gating signals IG and OG. TABLE-B discloses the microcoded program for the data path in FIG. 7. Such microprogramming may use a writable control store (WCS), or a read only store (ROS), micro-order decode circuits, and micro-order addressing circuits, all of which are well known in the art. Only a unique content of the ROS or WCS is essential to tailor its operation to obtain control signals according to this invention.

SRCH2 and SRCH3 programs in the APL language for the APL/360 interpreter program follow:

```
∇CC←SRCH2 ARG;S;ROW;BIT
  P←0
  C←1
  → 4 18 7[2  2 ⊥Z[0;NUM]]
  CC ← 1 1
  →0
  ρ AT LEAST TWO SINKS ARE PRESENT.
  ROW←Z[C;]
  BIT←ARG[2⊥ROW[NDX]]
  S←2 ⊥ROW[EDGE] ≠ EDGEτP
  → 11 15 [BIT]
  CC←ROW[FLG[0 1]]
  P←C
  C←S
  → 0 7[∧/CC]
  CC←ROW[FLG[2 3]]
  S←S+1
  →12
  CC ← 0 0
∇
```

-continued

```
∇CC←SRCH 3 ARG;S;ROW:BIT
  P←0
  C←1
  → 4 4 7[2[2⊥Z[0;NUM]]
  CC ← 1 1
  →0
  ρ AT LEAST TWO SINKS ARE PRESENT.
  ROW←Z[C;]
  BIT←ARG[2⊥ROW[NDX]]
  S←2 ⊥ROW[EDGE]
  →11 15 [BIT]
  CC←ROW[FLG][0 1]]
  P←C
  C←S
  → 0 7[∧/CC]
  CC← ROW[FLG[2 3]]
  S←S+1
  →12
∇
```

Reference may be made to patent application Ser. No. 136,951 for information on the APL programming notation.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A system for searching among entries represented in a computer system with a search argument, comprising, means for accessing one of said entries, means for selecting from said entry a bit position of said search argument, means for sensing a bit at said bit position in said search-argument to select one among plural output paths from said entry, means for generating from said entry one address of plural possible addresses to represent a selected one of said output paths, means for testing a signal field of said entry, and means for ending said search if said signal field provides an end signal, means for retrieving a next entry with said one address if said ending means does not provide an end signal, and again actuating said prior means for each next entry, which becomes said current entry, until said ending signal is provided, whereby said location of the next entry in said path generated from said entry providing said end signal is a result sought by said search.

2. A system for seaching as defined in claim 1 in which said selecting means comprises means for addressing a bit in said search argument by indexing said bit with the value of a field in said entry.

3. A system for searching as defined in claim 1, in which said generating means generates any one of said plural possible addresses, comprising means for adding the length of said entry to the address of said entry to generate one of said plural possible addresses.

4. A system for searching as defined in claim 1, in which said generating means generates any one of said plural possible addresses, comprising means for adding a value of an offset field in said entry to the address of said entry to generate one of said plural possible addresses.

5. A system for searching among entries as defined in claim 1, in which said testing means comprises means for indexing one of two signal fields in said entry in response to the value of the bit in the search argument obtained by said sensing means, and means for generating a signal in response to the value of the signal field obtained by said indexing means, whereby one condition of said signal provides said end signal.

6. A system for searching as defined in claim 1 in which said generating step generates any one of said plural possible addresses, comprising means for summing an integral multiple of said entry, and a value of an address field in said entry representing the address of a next entry, whereby said integral multiple is determined by said sensing means.

7. A system for tracing a search path in a directory represented in a computer system with a search argument, comprising means for accessing a next entry in directory beginning with its source, means for selecting from said entry a bit position of said search argument, means for sensing a bit at said bit position in said search-argument and testing the value of said bit to select one output path from said entry.

means for generating from an edge field a location of a next entry in a search path, means for testing a flag field of said entry, and means for continuing said search if said flag field indicates an inner vertex end is a next vertex in the search path, means for retrieving said next entry with said location obtained from said generating means, and means for repeating said prior steps for each next entry until a required entry is reached.

8. A method system of searching as defined in claim 7, in which said selecting means comprises means for addressing a bit in said search argument by indexing said bit with the value of a bit-index field in said entry.

9. A system for searching as defined in claim 7, in which said generating means generates the selected location, comprising means for adding one to the index of a successor pair edge representation with said entry to generate the other successor location in response to said sensing means.

10. A system for searching as defined in claim 7, in which said generating means selects said location, further comprising the step of means for adding a value of an offset field in said entry to the address of said entry to generate the location of a successor entry.

11. Apparatus for use in a computer machine for electrically following a connected path in a memory device containing a stored electrical signal network called a directory entity having electrical signal groups interconnected into a tree structure in which are represented one or more object identifiers, said electrical signal groups forming inner connected vertices and end-of-path sinks, each inner connected vertex including an index location signal and a connecting edge signal, said index location signal locating a particular digit location in an inputted object identifier, and said connecting edge signal connecting its vertex to a successor-pair signal group, the object identifier being inputted into a search argument store as a set of digitized electrical signals to be searched for in said directory entity, said apparatus comprising a clocking circuit providing timed electrical clock pulses to gating means for controlling the transfer of electrical signals, a vertex address register for storing an address of an electrical signal group in said stored electrical signal network, beginning with an electrical signal group in a source location of said stored electrical signal network, a group register for receiving the electrical signal group addressed by said vertex address register, said signal group including at least an index location signal and a connecting edge signal, vertex gating means for connecting the stored electrical signal network to said group register to transfer the addressed electrical signal group, index gating means for locating in said search argument store with said index location signal an electrical digit signal in the set of electrical signals comprising said inputted object identifier, means for indicating an electrical state for said electrical digit signal, and adder device for receiving at least the connecting edge signal and said electrical state for generating a next vertex location electrical signal from said group register and said indicating means, and a vertex address register being set by an output from said adder device for locating a next vertex in the stored electrical signal network.

12. Apparatus as defined in claim 11, further comprising flag-bit gating means for transferring an electrical state of at least one flag bit from said group register to signal when the end of a connected path is being reached in said stored electrical signal network for the inputted object identifier signal.

13. Apparatus as defined in claim 11, in which the connecting edge signals are of the invertible type, said apparatus further comprising vertex address gating means for transferring to said adder device the edge connecting signal in said group register and the prior content of said vertex address register for generating the address for locating a next electrical signal group in said stored electrical signal network.

14. Apparatus as defined in claim 12, said apparatus further comprising incrementing gating means connecting to said adder device and actuated by the condition of said electrical state provided by said indicating means for generating the adder output provided to said vertex address register, whereby the address in said vertex address register selects a next vertex which is a right successor or a left successor according to said electrical state provided by said indicating means.

15. Apparatus as defined in claim 11, further comprising flag bit gating means for transferring one of plural sets of condition code signals in the electrical signal group in said group register in response to the condition of the electrical state in said indicating means, whereby one condition code signal applies to a left successor vertex signal group and another condition code signal applies to a right successor vertex signal group in said stored electrical signal network.

16. Apparatus for use in a computer machine for electrically following a connected path in a memory device containing a stored electrical signal network called a directory entity having electrical cells inter-connected into a tree structure in which are represented one or more object identifiers, said electrical cells forming inner and sink vertices, each inner vertex including an index field and an edge field and a flag field, said index field being used for locating a particular digit in an inputted object identifier, and said edge field being used in addressing a next vertex in a connected path in said directory entity, the object identifier being inputted into a search argument store as a set of digitized electrical signals to be searched for in said directory entity, said apparatus comprising a clocking circuit providing a plurality of timed electrical clock pulses for controlling the transfer of electrical signals in said apparatus, a cell addressing register for storing an address of a vertex in said directory entity, beginning with a source vertex in an initial cell in said directory entity, a cell register for receiving a cell addressed by said cell addressing register, a particular clock pulse gate transferring the electrical signal state of the cell from the directory entity to said cell register, a search argument digit store, another clock pulse gate transferring a digit electrical state at an index location in said search argument store determined by the index field in said cell to said search argument digit store, AND gate circuits receiving the electrical signals from respective parts of the flag field in said cell register and also receiving complementary outputs of said search argument digit store to select a part of said flag field by activating part of said AND gate circuits, a condition code register, a further clock pulse gate transferring the part of the flag field outputted by said AND gate circuits to said condition code register, an adder device, other clock pulse gates transferring to said adder device the edge field in said cell register and the electrical state in said cell address register, and still other clock pulses transferring output signals from said adder device into said cell address register for accessing any next cell in the connected path in the directory entity, whereby a predetermined electrical state in the condition code register indicates that a sink vertex is in the cell register.

17. Apparatus as defined in claim 16, in which a latch circuit comprises said search argument digit store, whereby binary electrical signal states provide the respective digit positions in said search argument store.

* * * * *